United States Patent
Unagami et al.

(10) Patent No.: US 10,649,919 B2
(45) Date of Patent: May 12, 2020

(54) INFORMATION PROCESSING METHOD AND INFORMATION PROCESSING SYSTEM

(71) Applicant: Panasonic Intellectual Property Corporation of America, Torrance, CA (US)

(72) Inventors: Yuji Unagami, Osaka (JP); Naohisa Nishida, Osaka (JP); Shota Yamada, Tokyo (JP); Nuttapong Attrapadung, Saitama (JP); Takahiro Matsuda, Tokyo (JP); Goichiro Hanaoka, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 386 days.

(21) Appl. No.: 15/848,004

(22) Filed: Dec. 20, 2017

(65) Prior Publication Data

US 2018/0203808 A1     Jul. 19, 2018

(30) Foreign Application Priority Data

Jan. 16, 2017  (JP) ................ 2017-005403
Aug. 31, 2017  (JP) ................ 2017-167025

(51) Int. Cl.
*H04L 29/06*       (2006.01)
*G06F 12/14*       (2006.01)
(Continued)

(52) U.S. Cl.
CPC .......... *G06F 12/1408* (2013.01); *G06F 21/40* (2013.01); *H04L 9/008* (2013.01); *H04L 9/3247* (2013.01); *G06F 2212/1052* (2013.01)

(58) Field of Classification Search
None
See application file for complete search history.

(56) References Cited

U.S. PATENT DOCUMENTS

| 2010/0017870 A1* | 1/2010 | Kargupta ............ H04L 63/1408 726/14 |
| 2012/0297201 A1* | 11/2012 | Matsuda ............. G06F 21/6245 713/189 |

(Continued)

FOREIGN PATENT DOCUMENTS

| JP | 2016-131335 | 7/2016 |
| WO | 2014/185450 | 11/2014 |

OTHER PUBLICATIONS

Allison Bishop et al, "Function-Hiding Inner Product Encryption", Advances in Cryptology—ASIACRYPT 2015, published by Springer Berlin Heidelberg, Nov. 29, 2015 (URL:https://eprint.iacr.org/2015/672.pdf).

(Continued)

*Primary Examiner* — Shin-Hon (Eric) Chen
(74) *Attorney, Agent, or Firm* — Greenblum & Bernstein, P.L.C.

(57) ABSTRACT

In an information processing method, a query including a first encrypted feature value provided with confidential information unique to a user is received. The first encrypted feature value is generated by encrypting a first feature value calculated from privacy data of the user by using inner product encryption. A plurality of inner product values are acquired by computing an inner product of the first encrypted feature value and each of a plurality of second encrypted feature values. Privacy data of a plurality of pieces of privacy data having an inner product value of the first encrypted feature value and a second encrypted feature value with an encrypted reference feature value calculated from the privacy data being equal to or smaller than a predetermined threshold is transmitted. A secret key of the user is identified by using the confidential information when (Continued)

an unauthorized access is detected, and identification information is outputted.

8 Claims, 14 Drawing Sheets

(51) Int. Cl.
  *H04L 9/32* (2006.01)
  *G06F 21/40* (2013.01)
  *H04L 9/00* (2006.01)

(56) References Cited

U.S. PATENT DOCUMENTS

| | | |
|---|---|---|
| 2016/0080333 A1 | 3/2016 | Isshiki |
| 2016/0204936 A1 | 7/2016 | Sakemi et al. |
| 2017/0169241 A1* | 6/2017 | Unagami ............ G06F 12/1408 |

OTHER PUBLICATIONS

Mihir Bellare et al., "Foundations of Group Signatures: Formal Definitions, Simplified Requirements, and a Construction Based on General Assumptions", Advances in Cryptology—EUROCRYPT 2003, May 4, 2003 (searched on Aug. 1, 2017), Internet<URL:https://cseweb.ucsd.edu/~mihir/papers/gs.pdf>.

Kaoru Kurosawa et al., "Linear Code Implies Public-Key Traitor Tracing", Public Key Cryptography—PKC 2002, Feb. 12, 2002 (searched on Aug. 1, 2017), Internet<URL:https://eprint.iacr.org/2001/099.ps>.

Junichi Tomida et al., "Efficient Functional Encryption for Inner-Product Values with Full-Hiding Security", International Conference on Information Security—ISC 2016, Sep. 7, 2016, (searched on Aug. 1, 2017), Internet<URL:http://rd.springer.com/chapter/10.1007/978-3-319-45871-7_24>.

* cited by examiner

FIG. 10A

| (COMMAND TYPE) | (DATA) | |
|---|---|---|
| SIMILAR DATA REQUEST COMMAND | ENCRYPTED FEATURE VALUE | GROUP SIGNATURE |

FIG. 10B

| (COMMAND TYPE) | (DATA) | | |
|---|---|---|---|
| SIMILAR DATA REPLY COMMAND | ENCRYPTED REFERENCE DATA 1 | ... | ENCRYPTED REFERENCE DATA N |

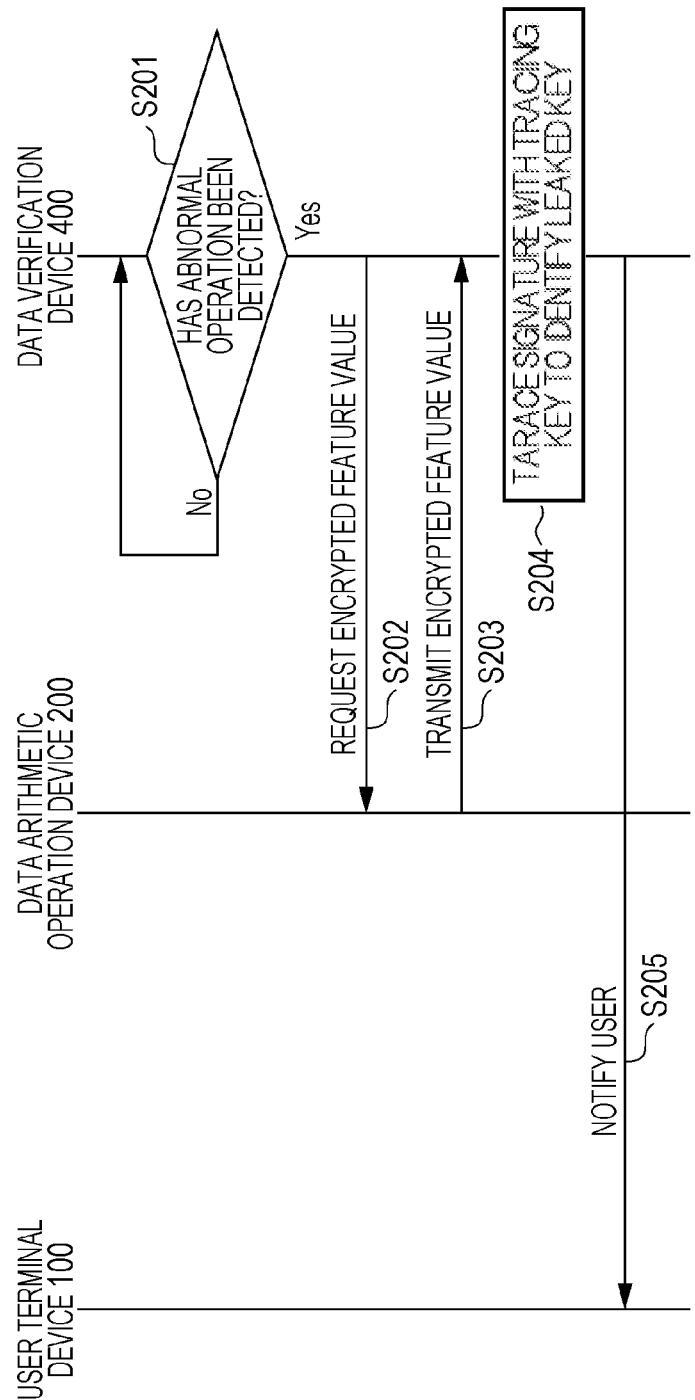

FIG. 14A $$CT_{\vec{x}} = (e_i^{-1}\vec{x} \circ \vec{H_i}, 0^{m(n+4)}, \alpha, \phi, 0, 0, 0)_{\hat{\mathbb{B}}}$$

FIG. 14B $$SK_{\vec{y}} = (\vec{y} \circ \vec{a}, 0^{m(n+4)}, 0, 0, \beta, \psi, 0)_{\hat{\mathbb{B}}^*}$$

FIG. 14C $$D = e(SK_{\vec{y}}, CT_{\vec{x}}) = g_T^{\vec{x} \cdot \vec{y}}$$

INFORMATION PROCESSING METHOD AND INFORMATION PROCESSING SYSTEM

BACKGROUND

1. Technical Field

The present disclosure relates to information processing methods and information processing systems.

2. Description of the Related Art

There has been a system which measures a blood pressure or the like at home to provide a user with an advice regarding diets and so forth based on an analysis at a server. This system can provide the user with a useful advice by making an analysis with reference to not only previous information about the user but also other similar medical cases. In searching similar medical cases at the server, in view of protection of privacy data, it is desirable that the information about the user and information about the other similar medical cases for reference are made confidential to the server.

International Publication No. 2014/185450 discloses a technique for a checking system which checks data to be authorized against authorized data, both as being encrypted, by using additive homomorphic encryption to make information confidential to a server.

SUMMARY

However, in checking the information about the user against information for reference at a user's terminal, if the amount of the information for reference is increased, an increase in processing load and communication data size at the user's terminal occurs. Moreover, if a key for encryption or decryption is leaked, privacy data is not protected.

One non-limiting and exemplary embodiment provides an information processing method and others which more appropriately protects privacy data while inhibiting an increase in processing load and communication data size at terminals.

In one general aspect, the techniques disclosed here feature a method for an information processing system including a first device, the first device including a processor and a memory, the method comprising: the memory storing a plurality of second encrypted feature values generated by encrypting each of a plurality of reference feature values calculated from a plurality of pieces of privacy data acquired in advance by using inner product encryption, each of the plurality of reference feature values being represented as an n-dimensional vector, and n being an integer equal to or larger than 1; the processor receiving, from a second device connected to the first device, a query including a first encrypted feature value provided with confidential information unique to a user, the first encrypted feature value being generated by encrypting a first feature value calculated from privacy data of the user by using inner product encryption and the first feature value being represented as an n-dimensional vector; the processor acquiring a plurality of inner product values by computing an inner product of the first encrypted feature value and each of the plurality of second encrypted feature values; the processor transmitting, to the second device, privacy data of the plurality of pieces of privacy data having an inner product value of the first encrypted feature value and a second encrypted feature value with an encrypted reference feature value calculated from the privacy data, the inner product value being equal to or smaller than a predetermined threshold; the processor identifying a secret key of the user by using the confidential information included in the query when an unauthorized access to the first device is detected; and the processor outputting identification information for identifying the secret key of the user to the second device.

The information processing method of the present disclosure can more appropriately protect privacy data while inhibiting an increase in processing load and communication data size at terminals.

It should be noted that general or specific embodiments may be implemented as a system, a device, an integrated circuit, a computer program, or a computer-readable recording medium such as CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A is a diagram depicting an example of a format of communication data in the embodiment;

FIG. 10B is a diagram depicting another example of the format of communication data in the embodiment;

FIG. 11 is a sequence diagram depicting the operation of the information processing system in the embodiment;

FIG. 14A is a first descriptive diagram of an encryption process of a user terminal device, a data providing device, and a data arithmetic operation device in a second modification example of the embodiment;

FIG. 14B is a second descriptive diagram of an encryption process of the user terminal device, the data providing device, and the data arithmetic operation device in the second modification example of the embodiment;

FIG. 14C is a third descriptive diagram of the encryption process of the user terminal device, the data providing device, and the data arithmetic operation device in the second modification example of the embodiment;

Figure 1A:
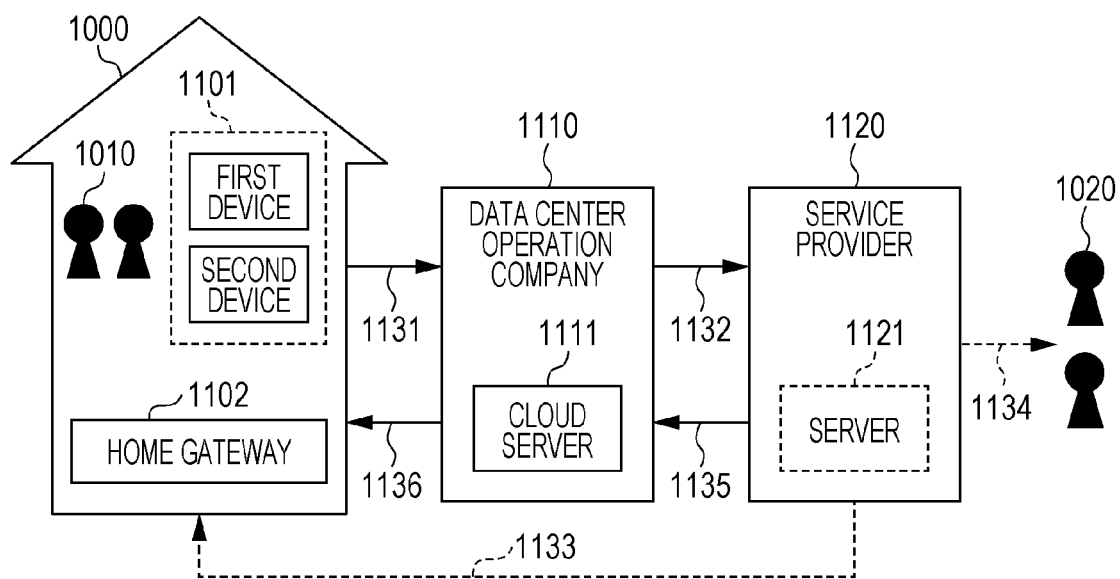
FIG. 1A is a diagram depicting an entire image of a service.

DETAILED DESCRIPTION (Underlying Knowledge Forming Basis of the Present Disclosure)

As a similarity search method with encrypted information, there is a method using homomorphic encryption. However, an arithmetic operation using homomorphic encryption is either one of addition and multiplication. For a similarity search, a Euclidean distance or inner product is used to derive a degree of similarity of a feature value. Therefore, a degree of similarity is not derived only by either one of addition or multiplication.

Moreover, if a secret key for use in encryption is leaked, from which user terminal device the secret key is leaked is not identified.

To solve these problems, a method according to one aspect of the present disclosure is a method for an information processing system including a first device, the first device including a processor and a memory, the method comprising: the memory storing a plurality of second encrypted feature values generated by encrypting each of a plurality of reference feature values calculated from a plurality of pieces of privacy data acquired in advance by using inner product encryption, each of the plurality of reference feature values being represented as an n-dimensional vector, and n being an integer equal to or larger than 1; the processor, receiving, from a second device connected to the first device, a query including a first encrypted feature value provided with confidential information unique to a user, the first encrypted feature value being generated by encrypting a first feature value calculated from privacy data of the user by using inner product encryption and the first feature value being represented as an n-dimensional vector; the processor acquiring a plurality of inner product values by computing an inner product of the first encrypted feature value and each of the plurality of second encrypted feature values; the processor transmitting, to the second device, privacy data of the plurality of pieces of privacy data having an inner product value of the first encrypted feature value and a second encrypted feature value with an encrypted reference feature value calculated from the privacy data, the inner product value being equal to or smaller than a predetermined threshold; the processor identifying a secret key of the user by using the confidential information included in the query when an unauthorized access to the first device is detected; and the processor outputting identification information for identifying the secret key of the user to the second device.

According to the above aspect, the information processing system uses the first encrypted feature value based on the privacy data of the user and the plurality of second encrypted feature values based on the plurality of pieces of privacy data to make a similarity judgment with the feature values encrypted, thereby appropriately protecting the privacy data. Also, with the similarity judgment, only the privacy data judged as similar to the privacy data of the user is provided to the second device, that is, the user terminal device. This can inhibit an increase in processing load and communication data size at the terminal devices. Furthermore, based on detection of an unauthorized access, if there is a possibility of leakage of the secret key used for encryption of the first encrypted feature value, a possibly leaked secret key can be identified. This allows a possibility of leakage of the secret key to be recognized, and allows operation such as system update so as to prohibit the leaked secret key. In this manner, the information processing system according to this aspect can more appropriately protect privacy data while inhibiting an increase in processing load and communication data size at terminals.

For example, the secret key of the user may be a signature generation key for a group signature of a group to which the user belongs, the confidential information may include the group signature, and the identifying may include identifying the signature generation key from the group signature by using a tracing key of the group signature included in the confidential information included in the query.

According to the above aspect, the information processing system can identify the secret key of the user by using the group signature as the confidential information unique to the user and using the tracing key of the group signature. Based on this specific structure, the information processing system according to this aspect can more appropriately protect privacy data while inhibiting an increase in processing load and communication data size at terminals.

For example, the secret key of the user may be a unique secret key as a secret key unique to the user in traitor tracing assigned to the second device, the first encrypted feature value provided with the confidential information may be encrypted by inner product encryption using the unique secret key, the second encrypted feature value may be encrypted by inner product encryption using a system secret key, and the identifying may include acquiring a first inner product value as an inner product value of the second encrypted feature value and the first encrypted feature value included in the query, generating, for each of plurality of users, a verification secret key with one of elements of the system secret key corresponding to a user of the plurality of users changed to a random number, acquiring, for each of the plurality of users, a second inner product value as an inner product value of a verification value generated by encrypting the reference feature value by inner product encryption using the verification secret key and the first encrypted feature value included in the query, and identifying a secret key of a user from among the plurality of users, the secret key having the first inner product value and the second inner product value not matching each other.

According to the above aspect, the information processing system can identify the secret key of the user by using the secret key unique to the user in traitor tracing as the confidential information unique to the user and by tracing process by traitor tracing. Based on this specific structure, the information processing system according to this aspect can more appropriately protect privacy data while inhibiting an increase in processing load and communication data size at terminals.

For example, the privacy data of the user may include vital data of the user.

According to the above aspect, by using the vital data of the user as the privacy data of the user, the information processing system can extract vital data similar to the vital data of the user from among a plurality of pieces of vital data. This allows the vital data to be more appropriately protected.

For example, the privacy data of the user may include log information indicating history of operation of a device or vehicle by the user.

According to the above aspect, by using log information about operation of a device or the like by the user as the privacy data of the user, the information processing system can extract log information about operation similar to the log information about operation by the user from among a plurality of pieces of log information about operation. This allows the log information about operation to be more appropriately protected.

For example, the first feature value may include a component indicating an index regarding at least one of a shape, size, weight, state, and movement of an entire or part of a body of the user.

According to the above aspect, the information processing system makes a similarity judgment by using the shape of the body of the user or the like as the feature value. Based on this specific structure, the information processing system according to this aspect can more appropriately protect privacy data while inhibiting an increase in processing load and communication data size at terminals.

For example, the plurality of pieces of privacy data may include vital data of a plurality of different persons.

According to the above aspect, the information processing system can extract vital data similar to the vital data of the user from among vital data of a plurality of different persons. This can avoid extraction of a plurality of pieces of vital data of the same person, thereby making extractable vital data more easily usable.

Also, an information processing system according to one aspect of the present disclosure is an information processing system including a first device, the information processing system including: a memory storing a plurality of second encrypted feature values generated by encrypting each of a plurality of reference feature values calculated from a plurality of pieces of privacy data acquired in advance by using inner product encryption, each of the plurality of reference feature values being represented as an n-dimensional vector and n being an integer equal to or larger than 1; and a processor that, in operation, performs operations including receiving, from a second device connected to the first device, a query including a first encrypted feature value provided with confidential information unique to the user, the first encrypted feature value being generated by encrypting a first feature value calculated from privacy data of a user by using inner product encryption and the first feature value being represented as an n-dimensional vector, acquiring a plurality of inner product values by computing an inner product of the first encrypted feature value and each of the plurality of second encrypted feature values, transmitting, to the second device, privacy data of the plurality of pieces of privacy data having an inner product value of the first encrypted feature value and a second encrypted feature value with an encrypted reference feature value calculated from the privacy data, the inner product value being equal to or smaller than a predetermined threshold, identifying a secret key of the user by using the confidential information included in the query when an unauthorized access to the first device is detected, and outputting identification information for identifying the secret key of the user to the second device.

According to the above aspect, the information processing system implements effects similar to those of the information processing method.

It should be noted that general or specific aspects may be implemented as a system, a device, an integrated circuit, a computer program, or a computer-readable recording medium such as CD-ROM, or any selective combination thereof.

Note that an embodiment descried below represents a general or specific example. In the following embodiment, numerical values, shapes, materials, components, arrangement position and connection style of the components, steps, step sequence, and so forth are merely examples, and are not meant to restrict the present disclosure. Also, among the components in the following embodiment, those not descried in independent claims each describing an upper-most concept are each described as any component.

In the specification, note that a sign "^" in formulas indicates exponentiation. For example, x^2 indicates $x^2$.

(Entire Image of Service to be Provided)

First, an entire image of a service provided by the information management system in the present embodiment is described.

FIG. 1A is a diagram of an entire image of a service provided by the information processing system. The information processing system includes a group 1000, a data center operation company 1110, and a service provider 1120.

The group 1000 is, for example, a company, organization, home, or the like, and has any size. The group 1000 includes a plurality of devices 1101 including a first device and a second device, and a home gateway 1102. The plurality of devices 1101 include a device connectable to the Internet and a device unconnectable by itself to the Internet. Here, the device connectable to the Internet is, for example, a smartphone, personal computer (PC), television set, or the like. The device unconnectable by itself to the Internet is, for example, lighting, washing machine, refrigerator, or the like. The plurality of devices 1101 may be unconnectable by themselves to the Internet, and may include a device connectable to the Internet via the home gateway 1102. Also, users 1010 use the plurality of devices 1101 in the group 1100.

The data center operation company 1110 includes a cloud server 1111. The cloud server 1111 is a virtual server linked to various devices via the Internet. The cloud server 1111 mainly manages huge data difficult to be handled by a normal database management tool or the like, that is, big data or the like. The data center operation company 1110 manages data and the cloud server 1111, and operates a data center which performs these, and so forth. Services being rendered by the data center operation company 1110 will be described in detail further below.

Figure 1B:
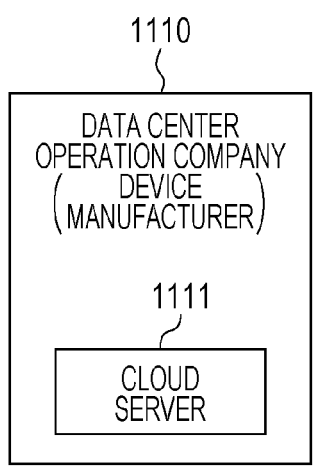
FIG. 1B is a diagram depicting an example in which a device manufacturer corresponds to a data center management company.
Figure 1C:
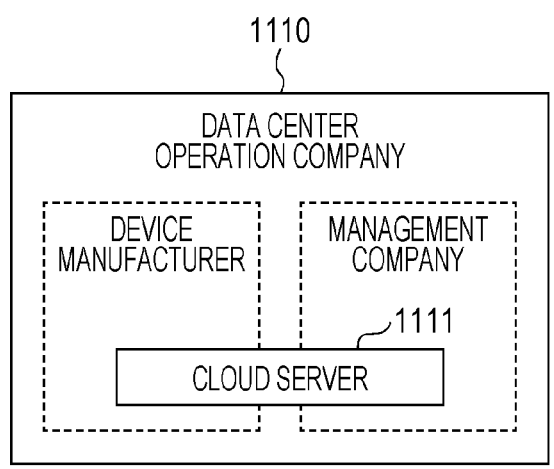
FIG. 1C is a diagram depicting an example in which both or either one of a device manufacturer and a management company corresponds to a data center management company.

Here, the data center operation company 1110 is not limited to a company which only manages data or the cloud server 1111. For example, as depicted in FIG. 1B, if a device manufacturer which develops and manufactures one of the plurality of devices 1101 manages data or the cloud server 1111, the device manufacturer corresponds to the data center operation company 1110. Also, the data center operation company 1110 is not limited to be formed of one company. For example, as depicted in FIG. 10, if a device manufacturer and a management company associate or share with each other to manage data or the cloud server 1111, either one or both of them correspond to the data center operation company 1110.

The service provider 1120 includes a server 1121. The server 1121 herein may have any size and, for example, includes a memory in a PC for an individual. Also, the service provider 1120 may not include the server 1121.

Note that the home gateway 1102 may not be included in the above-described information management system. For example, the home gateway 1102 is not provided when the cloud server 1111 performs entire data management. Also, for example, a device unconnectable by itself to the Internet may be absent if all devices at home are connected to the Internet.

Next, an information flow in the above-described information management system is described.

First, the first device or the second device of the group 1100 transmits each piece of log information to the cloud server 1111 of the data center operation company 1110. The cloud server 1111 accumulates the log information of the first device or the second device (arrow 1131 of FIG. 1A). Here, the log information is information indicating, for example, an operating situation, operation date and time, or the like of the plurality of devices 1101. For example, the log information includes, but not limited to, television viewing history, recorder timer-recording information, washing machine operation date and time, laundry amount, refrigerator open/close date and time, refrigerator open/close count, or the like, and may include various information acquirable from various devices. The log information may be provided via the Internet from the plurality of devices 1101 themselves directly to the cloud server 1111. Also, the log information may be once accumulated in the home gateway 1102 from the plurality of devices 1101 and then provided from the home gateway 1102 to the cloud server 1111.

Next, the cloud server 1111 of the data center operation company 1110 provides a certain unit of the accumulated log information to the service provider 1120. Here, the certain unit may be a unit acquired by organizing the information accumulated by the data center operation company 1110 so as to be providable to the service provider 1120 or a unit requested by the service provider 1120. Also, the accumulated log information may not be provided in the certain unit, and the amount of information to be provided may be varied in accordance with the situation. The log information is stored optionally in the server 1121 included in the service provider 1120 (arrow 1132 of FIG. 1A).

The service provider 1120 then organizes the log information into information fitting to the service to be provided to the user and provides the resultant information to the user. The user who is provided with the information may be the user 1010 using the plurality of devices 1101 or an external user 1020. In an example of a method of providing information to the users 1010 and 1020, information may be provided from the service provider 1120 directly to the users 1010 and 1020 (arrow 1134 of FIG. 1A). Also, in an example of a method of providing information to the users 1010, information may be provided to the users 1010 via the cloud server 1111 of the data center operation company 1110 again (arrows 1135 and 1136 of FIG. 1A). Furthermore, the cloud server 1111 of the data center operation company 1110 may organize the log information into information fitting to the service to be provided to the user and provide the resultant information to the service provider 1120.

Note that the users 1010 may be identical to or different from the user 1020.

First Embodiment

In a first embodiment, an information processing system and information processing method which more appropriately protect privacy data while inhibiting an increase in processing load and communication data size at terminals are described.

1. Structure
1.1 Entire Structure of Information Processing System

Figure 2:
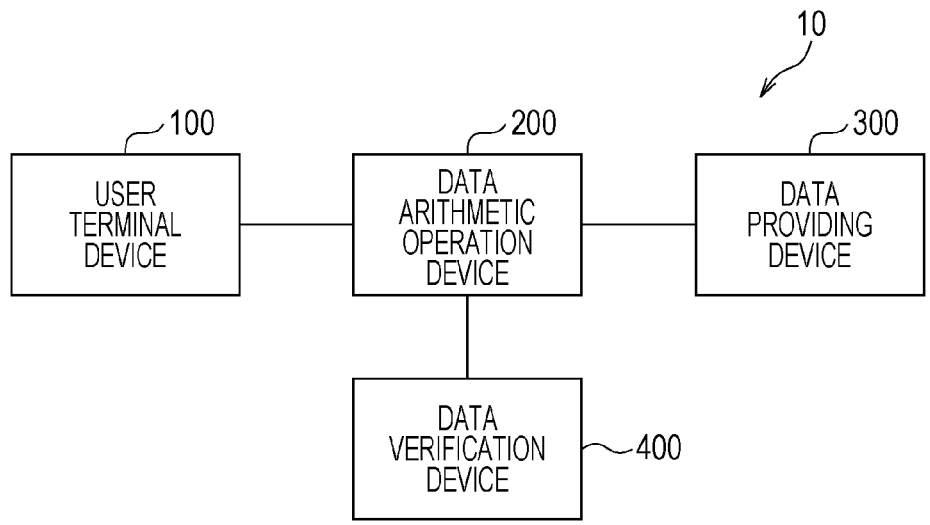
FIG. 2 is a diagram depicting an entire structure of an information processing system in an embodiment.

FIG. 2 is a diagram depicting an entire structure of an information processing system 10 in the present embodiment. The information processing system 10 includes a user terminal device 100, a data arithmetic operation device 200, and a data providing device 300.

While the information processing system 10 includes one user terminal device 100, one data arithmetic operation device 200, and one data providing device 300 in FIG. 2, the number of each device may be two or more.

Also, a connection style between these devices may be either one of wired communication and wireless communication, or may be any of an intra-corporate network, domestic network, dedicated circuit, the Internet, and so forth. Also, communication may not be on a real-time basis. For example, the user terminal device 100 may collect a plurality of pieces of sensed information and similarity search request data, and collectively transmit the collected request data to the data arithmetic operation device 200.

1.2 User Terminal Device

Figure 3:
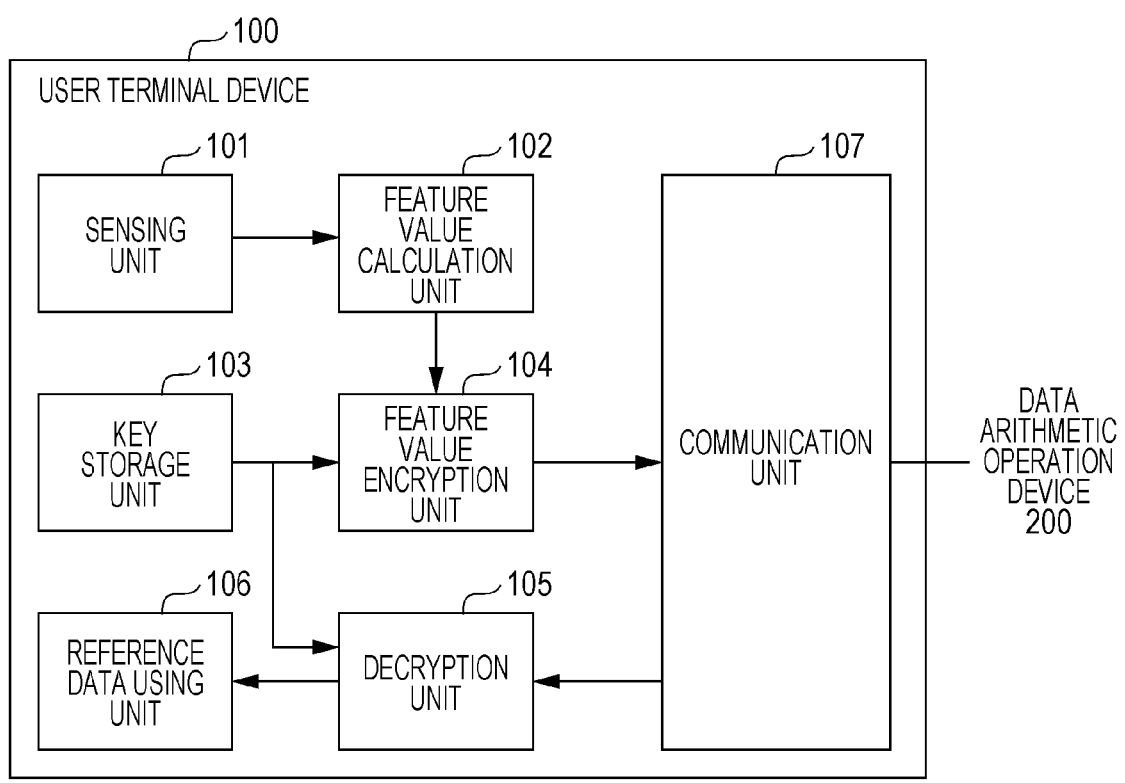
FIG. 3 is a structural diagram depicting the structure of a user terminal device in the embodiment.

FIG. 3 is a structural diagram depicting the structure of the user terminal device 100. The user terminal device 100 is configured to include a sensing unit 101, a feature value calculation unit 102, a key storage unit 103, a feature value encryption unit 104, a decryption unit 105, a reference data using unit 106, and a communication unit 107. Note that the user terminal device 100 corresponds to the second device.

The user terminal device 100 can be implemented on, for example, a computer including a processor or microprocessor, memory, sensor, communication interface, and so forth. The memory is a read only memory (ROM), random access memory (RAM), or the like, and can store a program to be executed by the processor. Here, the program is a computer program as software.

The computer program is configured by combining a plurality of instruction codes each indicating an instruction to the processor to implement a predetermined function. For example, with the processor executing the program stored in the memory, various functions in the user terminal device 100 can be implemented.

The user terminal device 100 is a device which senses information about the user or presents information to the user. The user terminal device 100 senses information about the user, for example, a blood pressure or heart rate or computed tomography (CT) scan information of the user. From the information acquired by sensing, the user terminal device 100 extracts a feature value, requests the data arithmetic operation device 200 to provide reference data about medical cases similar to this feature value, and uses the acquired reference data for the service to the user. Here, the reference data about medical cases is, for example, information including medical case names.

1.2.1 Sensing Unit

The sensing unit 101 acquires information about the user by sensing. The sensing unit 101 can be configured to include one or more sensors or measurement devices for sensing, such as a sphygmomanometer, CT scanner, camera, image sensor, or the like.

The information to be sensed by the sensing unit 101 is vital data, for example, a blood pressure, body temperature, heart rate, or the like of the user. For example, the information may be image information such as a face image, echogram, or CT scan information acquired by imaging or measuring the body of the user.

Also, the information to be sensed may be, for example, position information acquired by the Global Positioning System (GPS), log information indicating a history of operations by the user on an electric device or a movable body such as a vehicle, or user purchase history information regarding products or the like.

The log information can be information with various information acquired or measured in conjunction with vehicle's steering wheel operation, accelerator pedal operation, brake pedal operation, gear change operation, and so forth being associated with respective operation times. Here, the above various information include a displacement, speed, acceleration, or the like.

The sensed information about the user can be, for example, privacy data, which relates to a user's personal matter undesired to be known to others.

The information processing system 10 is a system which can make a similarity search, with privacy data made confidential. Description is made herein by assuming that the information about the user sensed at the sensing unit 101 is privacy data.

The privacy data sensed at the sensing unit 101 is processed at each unit in the user terminal device 100, is encrypted by the feature value encryption unit 104, and is then transmitted to the data arithmetic operation device 200 for a similarity search.

1.2.2 Feature Value Calculation Unit

The feature value calculation unit 102 calculates a feature value from the privacy data, which is information acquired at the sensing unit 101. The feature value calculated by the feature value calculation unit 102 can be represented by a vector including a plurality of components. This feature value includes, as a component, an index regarding at least one of a shape, size, weight, state, and movement of an entire or part of the body of the user, for example. Note that the above component may be referred to as an element.

The body part of the user in relation to the feature value may be any, for example, eyes, nose, ears, hands, feet, organs, blood vessels, or the like. Examples of the state of the entire or part of the body of the user include a health condition, moisture content, blood pressure, and oxygen saturation. Examples of the movements of the entire or part of the body of the user include body movements and microvibrations. Here, the health condition includes a condition for each of various examination items for use in a medical examination. Examples of the index regarding body movements include the number of times of tossing and turning per unit time. Examples of the index regarding microvibrations include a heart rate, respiratory rate, and inspiration/expiration rate.

Also, the feature value may be information about, for example, a main component of a feature parameter or a position, area, width, or the like of a certain region in a face image of the user.

Furthermore, the feature value may be information represented by a vector including, as a component, a coefficient of each term when a temporal change of an element is represented by, for example, a polynomial, from the history of the information about the user acquired at the sensing unit 101.

The feature value extracted from the information acquired at the sensing unit 101 can also be privacy data.

1.2.3 Key Storage Unit

The key storage unit 103 stores a key for use in an encryption process at the feature value encryption unit 104 and the decryption unit 105. Here, the encryption process includes a process regarding encryption, decryption, or signature generation.

The cryptosystems and keys for use by the feature value encryption unit 104 and the decryption unit 105 may be identical to or different from each other.

For example, the keys for use by the feature value encryption unit 104 are a secret key for inner-product encryption allowing inner product computation with encryption and a signature generation key for use in signature generation. In this case, the key for use by the decryption unit 105 is a secret key of the user terminal device 100 in known public key cryptosystem, that is, a secret key paired with a public key shared by the data arithmetic operation device 200 or the data providing device 300.

Also, the secret key used by the feature value encryption unit 104 may also be used by the decryption unit 105.

1.2.4 Feature Value Encryption Unit

The feature value encryption unit 104 encrypts the feature value calculated by the feature value calculation unit 102 by using a predetermined cryptosystem. In this encryption, the feature value encryption unit 104 uses a key stored in the key storage unit 103.

The feature value encryption unit 104 performs an arithmetic operation for a similarity search, with the feature value encrypted at the data arithmetic operation device 200, that is, performing encryption by using a predetermined inner product encryption allowing inner product computation. Also, the feature value encryption unit 104 generates a group signature for ciphertext using inner product encryption. The inner product encryption is not described herein in detail because it is possible to adopt a known method disclosed in "Function-Hiding Inner Product Encryption", Allison Bishop and other two, [online], "Advances in Cryptology—ASIACRYPT 2015" [searched on Aug. 1, 2017], Internet (URL: https://eprint.iacr.org/2015/672.pdf), Springer Berlin Heidelberg or "Efficient Functional Encryption for Inner-Product Values with Full-Hiding Security", Junichi Tomida and other two, [online], "International Conference on Information Security—ISC 2016", [searched on Aug. 1, 2017], Internet (URL: http://rd.springer.com/chapter/10.1007/978-3-319-45871-7_24), Springer Berlin Heidelberg.

Also, group signature is not described herein in detail because it is possible to adopt a known method disclosed in "Foundations of Group Signatures: Formal Definitions, Simplified Requirements, and a Construction Based on General Assumptions", Mihir Bellare and other two, [online], "Advances in Cryptology—EUROCRYPT 2003", [searched on Aug. 1, 2017], Internet (URL: https://cseweb.ucsd.edu/~mihir/papers/gs.pdf), Springer Berlin Heidelberg.

Furthermore, when a Euclidean distance is used as a degree of similarity for a similarity search, feature value conversion is performed. A feature value conversion method will be described further below.

1.2.5 Decryption Unit

The decryption unit 105 decrypts encrypted reference data transmitted from the data arithmetic operation device 200. This reference data includes the similarity search results. In decryption, the decryption unit 105 uses the key stored in the key storage unit 103.

1.2.6 Reference Data Using Unit

The reference data using unit 106 uses the reference data acquired by decryption at the decryption unit 105. The reference data is used, for example, by being presented to the user.

The reference data using unit 106 can be implemented to include, for example, a display, an audio output device, that is, loudspeaker, or another user interface.

The reference data is presented, for example, by being displayed on a display of the user terminal device 100 in a format of a graph, statistic information format, or the like or by outputting audio indicating the reference data from the loudspeaker.

Also, the reference data using unit 106 may perform a predetermined arithmetic operation, information search, or the like based on the reference data to present a recommendation for a medical examination at hospital, an advice for improvement in living habits to the user, an advice on food recommendation, or the like.

1.2.7 Communication Unit

The communication unit 107 performs communications with the data arithmetic operation device 200. For communications, for example, encrypted communication based on the Transport Layer Security (TLS) protocol is used. The TLS protocol is also simply referred to as TLS.

By the communication unit 107, the user terminal device 100 and the data arithmetic operation device 200 mutually authenticate each other based on TLS for data encryption. A public key certificate and a secret key for use in TLS are retained by the communication unit 107.

The communication unit 107 transmits, to the data arithmetic operation device 200, a query, which is a similarity search request including a set of an encrypted feature value, which is a feature value encrypted by the feature value encryption unit 104, and a group signature.

Also, the communication unit 107 receives encrypted reference data as a response from the data arithmetic operation device 200 for the similarity search request and provides the reference data to the decryption unit 105. Here, the encrypted reference data includes the similarity search results.

1.3 Data Arithmetic Operation Device

Figure 4:
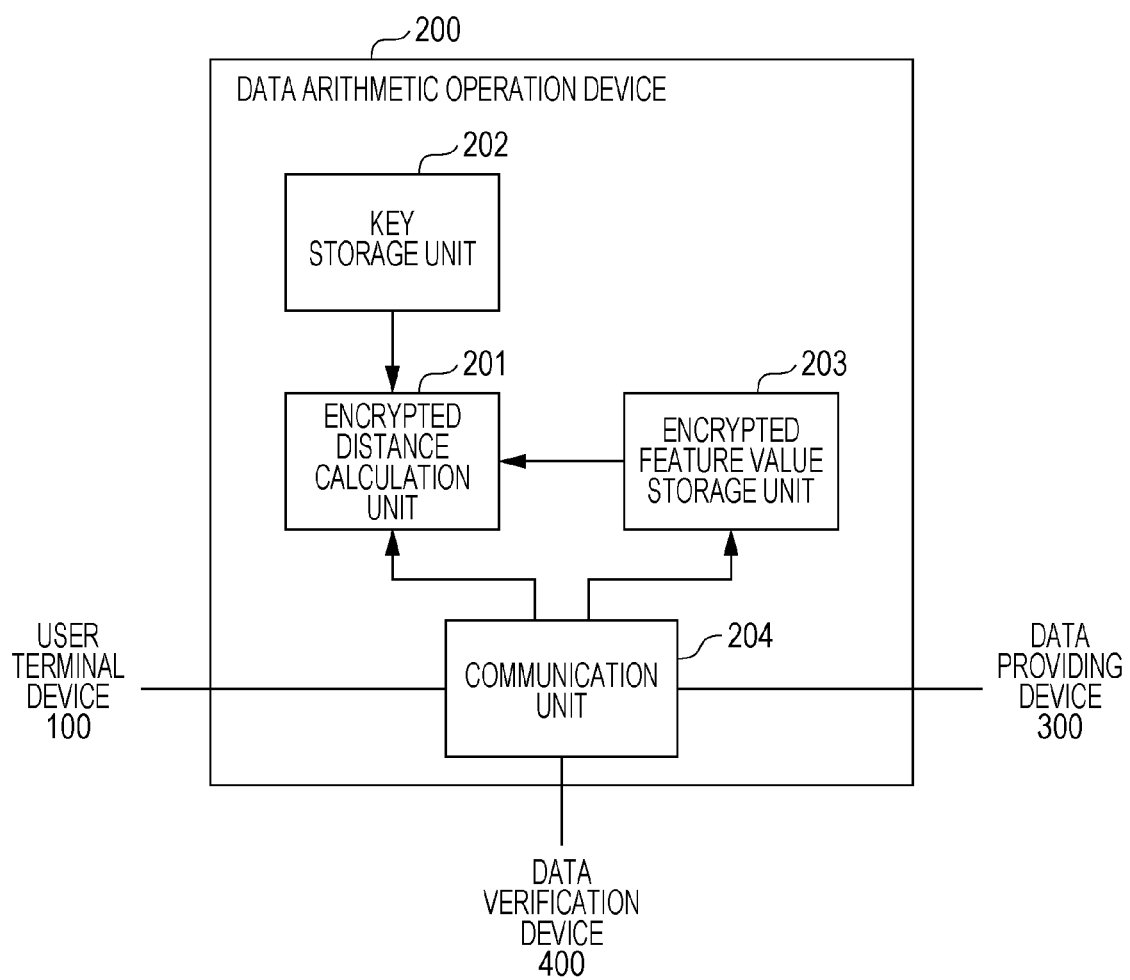
FIG. 4 is a structural diagram depicting the structure of a data arithmetic operation device in the embodiment.

FIG. 4 is a structural diagram depicting the structure of the data arithmetic operation device 200. The data arithmetic operation device 200 is configured to include an encrypted distance calculation unit 201, a key storage unit 202, an encrypted feature value storage unit 203, and a communication unit 204. Note that the data arithmetic operation device 200 corresponds to the first device.

As with the user terminal device 100, the data arithmetic operation device 200 can be implemented on, for example, a computer including a processor, memory, communication interface, and so forth. For example, with the processor executing a program stored in the memory, various functions in the data arithmetic operation device 200 can be implemented.

The data arithmetic operation device 200 functions as a server making a similarity search. The data arithmetic operation device 200 receives a similarity search request regarding the feature value from the user terminal device 100. This similarity search request includes information acquired by converting and encrypting the feature value. In response to the received similarity search request, the data arithmetic operation device 200 makes a similarity search regarding the reference feature value provided from the data providing device 300, and transmits, to the user terminal device 100, reference data indicating the search result as a response to the request.

The similarity search includes, for example, selection of a reference feature value with a feature similar to that of the feature value from a set of reference feature values calculated from information such as vital data of each of plurality of persons other than the user comparable with the feature amount. Also, the similarity search can further include identifying reference data corresponding to that reference feature value. Here, the reference data corresponding to the reference feature value includes, for example, information about medical cases regarding a person corresponding to the reference feature value.

1.3.1 Encrypted Distance Calculation Unit

The encrypted distance calculation unit 201 acquires a query by reception via the communication unit 204, the query being a similarity search request transmitted by the user terminal device 100. The query includes a set of an encrypted feature value and a group signature. Here, the encrypted feature value corresponds to a first encrypted feature value. The group signature is an example of confidential information unique to each user. Note that this function corresponds to a function of a reception unit.

Also, the encrypted distance calculation unit 201 acquires a plurality of encrypted reference feature values. The plurality of encrypted reference feature values are acquired by encrypting a plurality of reference feature values by the encrypted feature value storage unit 203.

The encrypted distance calculation unit 201 verifies the encrypted feature values received from the user terminal device 100. The encrypted distance calculation unit 201 uses a signature verification key of a group signature stored in the key storage unit 202 to perform signature verification of the group signature. When judging that the signature is invalid in signature verification, the encrypted distance calculation unit 201 returns an error without performing a distance calculation.

When judging that the signature is valid in signature verification, the encrypted distance calculation unit 201 finds an inner product of the encrypted feature value received from the user terminal device 100 and each of the plurality of encrypted reference feature values received and stored from the data providing device 300 with encryption by inner product computation. Note that this function corresponds to a function of an arithmetic operation unit.

For example, when a feature value vector is taken as an n-dimensional vector $X=(x1, x2, x3, \ldots, xn)$ and one of reference feature value vectors is taken as an n-dimensional vector $Y1=(y11, y12, y13, \ldots, y1n)$, an inner product value $<X, Y1>$ of these two vectors X and Y1 can be found with encryption by the following Equation (1), in accordance with inner product encryption of the above-cited document "Function-Hiding Inner Product Encryption" or the above-cited document "Efficient Functional Encryption for Inner-Product Values with Full-Hiding Security".

$$<X, Y1> = \Sigma xi \cdot y1i, \text{ where } i=1, \ldots, n \quad (1)$$

Also, with conversion in advance at the feature value encryption unit 104 of the user terminal device 100 and a reference feature value encryption unit 302 of the data providing device 300, the encrypted distance calculation unit 201 can calculate a Euclidean distance D1 in the following Equation (2).

$$D1 = E(xj - y1j)^2, \text{ where } j=1, \ldots, n \quad (2)$$

Here, $\Sigma(xj-y1j)^2$ indicates a total sum from the square value of $(x1-y11)$ to the square value of $(xn-y1n)$.

Note that while a general Euclidean distance is defined as the square root of D1, D1 is taken as a Euclidean distance herein for description. Meanwhile D1 is formally called the squared Euclidean distance.

An inner product of a vector $X' = (\Sigma xj^2, 1, x1, x2, \ldots, xn)$ converted from the vector X of the feature value at the user terminal device 100 and a vector $Y1' = (1, \Sigma y1j^2, -2y11, -2y12, \ldots, -2y1n)$ converted from one vector Y1 of the vectors of the plurality of reference feature values at the data providing device 300 is computed as in the following Equation (3) by using inner product encryption of the above-cited document "Function-Hiding Inner Product Encryption" or the above-cited document "Efficient Functional Encryption for Inner-Product Values with Full-Hiding Security". Here, the vector X1' is also referred to as a vector of a first converted feature value and the vector Y1' is also referred to as a vector of a second converted feature value.

$$\langle X', Y1' \rangle = \sum xj^2 + \sum y1j^2 - 2x1 \cdot y11 - 2x2 \cdot y12 - \ldots - 2xn \cdot y1n \quad (3)$$
$$= \sum (xj - y1j)^2$$

As in Equation (3), by computing an inner product of the vector X' converted from the vector X of the feature value and the vector Y1' converted from the vector Y1 of the reference feature value, an encrypted Euclidean distance between the feature value and the reference feature value can be found. By decrypting this encrypted Euclidean distance, a Euclidean distance can be found.

Based on whether the inner product found by inner product computation or the Euclidean distance satisfies a condition, the encrypted distance calculation unit 201 determines whether the feature value and the reference feature value are similar to each other. The condition for determining whether the feature value and the reference feature value are similar to each other is such that, for example, the inner product is equal to or smaller than a predetermined threshold. Here, the threshold is 1, for example. Also, this condition is also referred to as a condition for similarity judgment.

When determining that the feature value and the reference feature value are similar to each other, the encrypted distance calculation unit 201 temporarily stores an identifier (ID) associated with the corresponding reference feature value. Here, the corresponding reference feature value is the encrypted reference feature value used in inner product computation for determining whether to satisfy the above condition.

When not determining that the feature value and the reference feature value are similar to each other, the encrypted distance calculation unit 201 does not store the ID of the corresponding reference feature value.

The encrypted distance calculation unit 201 performs inner product computation by using each of the plurality of encrypted reference feature values stored in the encrypted feature value storage unit 203 and the encrypted feature value received from the user terminal device 100 to determine whether to satisfy the above condition. Thus, among the plurality of reference feature values stored in the encrypted feature value storage unit 203, only the ID associated with one or more reference feature values similar to the feature value is stored and thus extracted. Then, the data arithmetic operation device 200 provides the extracted ID to the data providing device 300, and the reference data corresponding to the extracted ID is provided from the data providing device 300 to the user terminal device 100.

1.3.2 Key Storage Unit

The key storage unit 202 stores a key for use at the encrypted distance calculation unit 201. For example, the key to be used by the encrypted distance calculation unit 201 is a signature verification key for group signature.

1.3.3 Encrypted Feature Value Storage Unit

The encrypted feature value storage unit 203 stores an encrypted reference feature value provided from the data providing device 300 in a memory. The encrypted reference feature value corresponds to a second encrypted feature value.

Also, the encrypted feature value storage unit 203 stores a set of the encrypted feature value received upon the similarity search request from the user terminal device 100 and the group signature.

1.3.4 Communication Unit

The communication unit 204 performs communications with the user terminal device 100, the data providing device 300, and a data verification device 400. In these communications, encryption communications by TLS are used. That is, communicating devices mutually authenticate by TLS for data encryption. A public key certification and a secret key for use in TLS are retained by the communication unit 204.

Also, in response to a request from the data verification device 400, the communication unit 204 transmits a set of the encrypted feature value stored in the encrypted feature value storage unit 203 and a group signature. The set of the encrypted feature value and the group signature that is transmitted is acquired from the user terminal.

1.4 Data Providing Device

The data providing device 300 can be implemented on, for example, a computer including a processor, memory, communication interface, and so forth. For example, with the processor executing a program stored in the memory, various functions in the data providing device 300 can be implemented.

When requested for a plurality of encrypted reference feature values from the data arithmetic operation device 200, in response to this request, the data providing device 300 transmits the plurality of encrypted reference feature values with their IDs to the data arithmetic operation device 200. Also, when requested for reference data from the data arithmetic operation device 200 by designating an ID, in response to this request, the data providing device 300 transmits the reference data with the corresponding ID to the data arithmetic operation device 200. The plurality of encrypted reference feature values correspond to second encrypted feature values.

Figure 5:
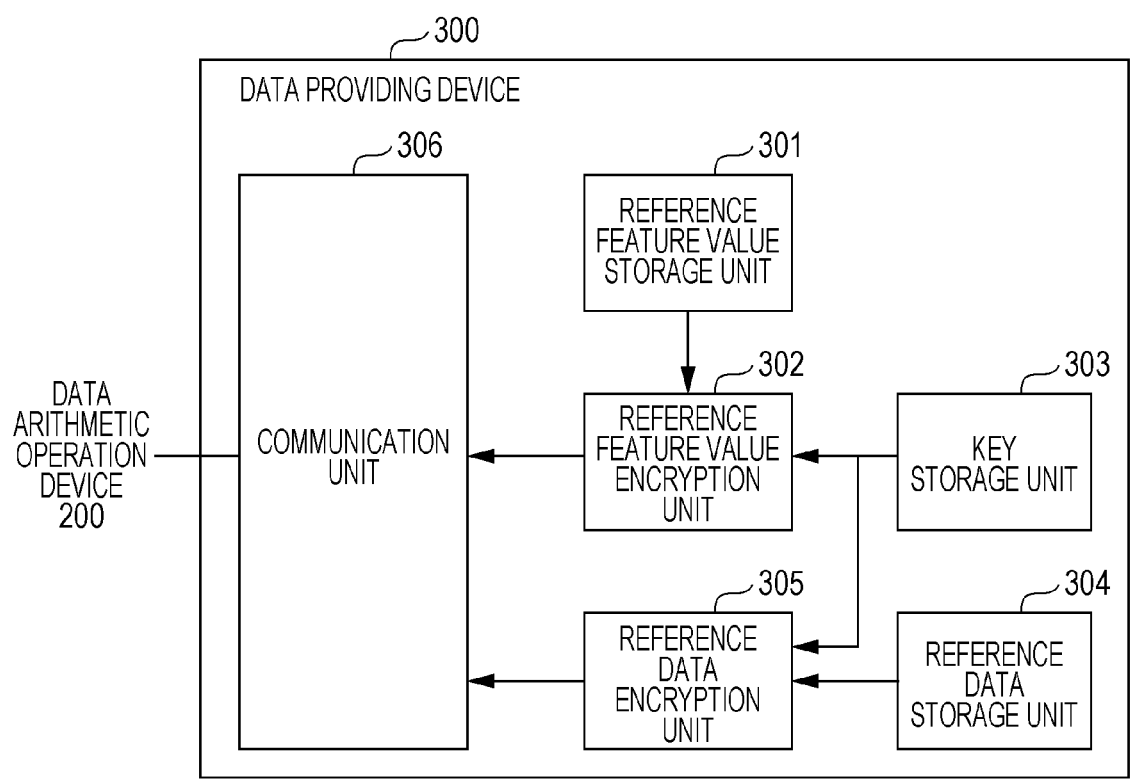
FIG. 5 is a structural diagram depicting the structure of a data providing device in the embodiment.

The data providing device 300 is configured to include, as depicted in FIG. 5, a reference feature value storage unit 301, the reference feature value encryption unit 302, a key storage unit 303, a reference data storage unit 304, a reference data encryption unit 305, and a communication unit 306.

1.4.1 Reference Feature Value Storage Unit

The reference feature value storage unit 301 stores reference feature values as search targets for a similarity search by the data arithmetic operation device 200. The reference feature values are a plurality of feature values calculated from privacy data of a plurality of persons other than the user, more specifically, vital data information.

The reference feature value can be compared with a feature value of information from the user terminal device 100. That is, the reference feature value is represented by a vector of the same dimension as that of the feature value. For example, when the feature value is represented by an n-dimensional vector, the reference feature value is also represented by an n-dimensional vector. The information from the user terminal device 100 includes information with a feature value converted and encrypted.

Figure 6A:
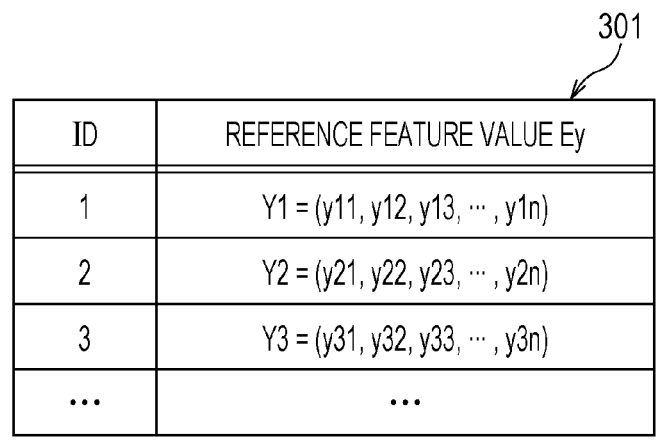
FIG. 6A is a diagram depicting an example of a reference feature value storage unit of the data arithmetic operation device in the embodiment.

FIG. 6A depicts an example of the reference feature values stored in the reference feature value storage unit 301. In the reference feature value storage unit 301, each of the plurality of reference feature values is stored in association with an ID as an identifier. In the example of FIG. 6A, each ID is stored in association with a reference feature value Ey in the reference feature value storage unit 301. In this example, the plurality of reference feature values are represented as k n-dimensional vectors $Yi=(yi1, yi2, yi3, \ldots, yin)$. Here, k is the number of the plurality of reference feature values, and i is an integer from 1 to k.

For example, each reference feature value is calculated from information such as the measurement results of a plurality of different persons. For example, an index regarding at least one of the shape, size, weight, state, and movement of the entire or part of the body of a person measured may be included as a component.

The ID can be an identifier for distinguishing the person regarding the reference feature value from other persons.

Also, the ID associated with the reference feature value stored in the reference feature value storage unit 301 corresponds to an ID associated with reference data stored in the reference data storage unit 304, which will be described further below.

1.4.2 Reference Feature Value Encryption Unit

The reference feature value encryption unit 302 encrypts a reference feature value by using a predetermined cryptosystem. In this encryption, the reference feature value encryption unit 302 uses a key stored in the key storage unit 303.

The reference feature value encryption unit 302 performs encryption on each of the plurality of reference feature values in the reference feature value storage unit 301 by using the same predetermined inner product encryption as that of the feature value encryption unit 104 of the user terminal device 100. Also, when a Euclidean distance is used as a degree of similarity for a similarity search, feature value conversion is performed.

1.4.3 Key Storage Unit

The key storage unit 303 stores a key for use in each encryption process at the reference feature value encryption unit 302 and the reference data encryption unit 305. The cryptosystems and keys to be used by the reference feature value encryption unit 302 and the reference data encryption unit 305 may be identical to or different from each other. For example, the key to be used by the reference feature value encryption unit 302 is a secret key for inner product encryption allowing inner product computation with encryption.

The key to be used by the reference data encryption unit 305 may be, for example, a public key of the user terminal device 100 or a secret key shared between the data providing device 300 and the user terminal device 100.

Also, the same secret key used by the reference feature value encryption unit 302 may be used by the reference data encryption unit 305.

1.4.4 Reference Data Storage Unit

Figure 6B:
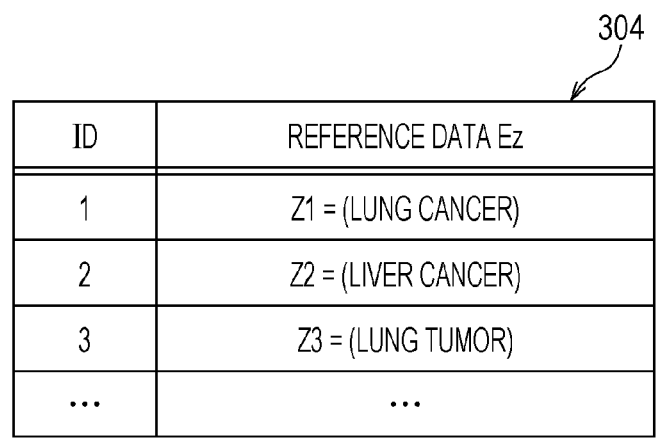
FIG. 6B is a diagram depicting an example of a reference data storage unit of the data arithmetic operation device in the embodiment.

The reference data storage unit 304 stores a plurality of pieces of reference data corresponding to the plurality of reference feature values to be searched when a similarity search is made in response to a request from the user terminal device 100. For example, the reference data storage unit 304 stores reference data corresponding to the reference feature value calculated from information such as the measurement result of a person. FIG. 6B is a diagram of an example of reference data stored in the reference data storage unit 304.

In the reference data storage unit 304, each of the plurality of pieces of reference data is stored in association with an ID as an identifier. By the ID, the reference feature value and the reference data are associated. In the example of FIG. 6B, an ID and reference data Ez are stored for each ID.

Each piece of reference data can be calculated from information such as the measurement result of each of the plurality of persons, for example. For example, when the reference feature value is a CT image, blood pressure, heart rate, or the like as an index regarding the body of a person, the reference data may be a disease, disease history, or the like of that person.

Also, for example, when the reference feature value indicates position information of a person, the reference data may be a history of products purchased by that person or the like. In the example of FIG. 6B, the reference data storage unit 304 accumulates information regarding diseases previously suffered, such as lung cancer suffered by a person with an ID of 1 and liver cancer suffered by a person with an ID of 2.

Note that the reference data may be encrypted and stored in the reference data storage unit 304.

The reference data storage unit 304 and the reference feature value storage unit 301 are implemented as, for example, a storage medium such as a memory or hard disk in the data arithmetic operation device 200. In the storage medium, a plurality of pieces of reference data and a plurality of reference feature values are stored in associated with one another.

1.4.5 Reference Data Encryption Unit

Among the reference data retained in the reference data storage unit 304, the reference data encryption unit 305 encrypts the reference data requested from the data arithmetic operation device 200 by designating an ID, and transmits the encrypted reference data to the data arithmetic operation device 200 via the communication unit 306.

Here, the key for use in encryption may be a public key of the user terminal.

1.4.6 Communication Unit

The communication unit 306 performs communications with the data arithmetic operation device 200. For communications, for example, encrypted communication based on TLS is used. By the communication unit 306, the data providing device 300 and the data arithmetic operation device 200 mutually authenticate each other based on TLS for data encryption. A public key certificate and a secret key for use in TLS are retained by the communication unit 306.

1.5 Data Verification Device

The data verification device 400 can be implemented on, for example, a computer including a processor, memory, communication interface, and so forth. For example, with the processor executing a program stored in the memory, various functions in the data verification device 400 can be implemented.

Upon receiving a set of an encrypted feature value and a group signature from the data arithmetic operation device 200, the data verification device 400 identifies a signature generation key used in the group signature to identify the user terminal.

Figure 7:
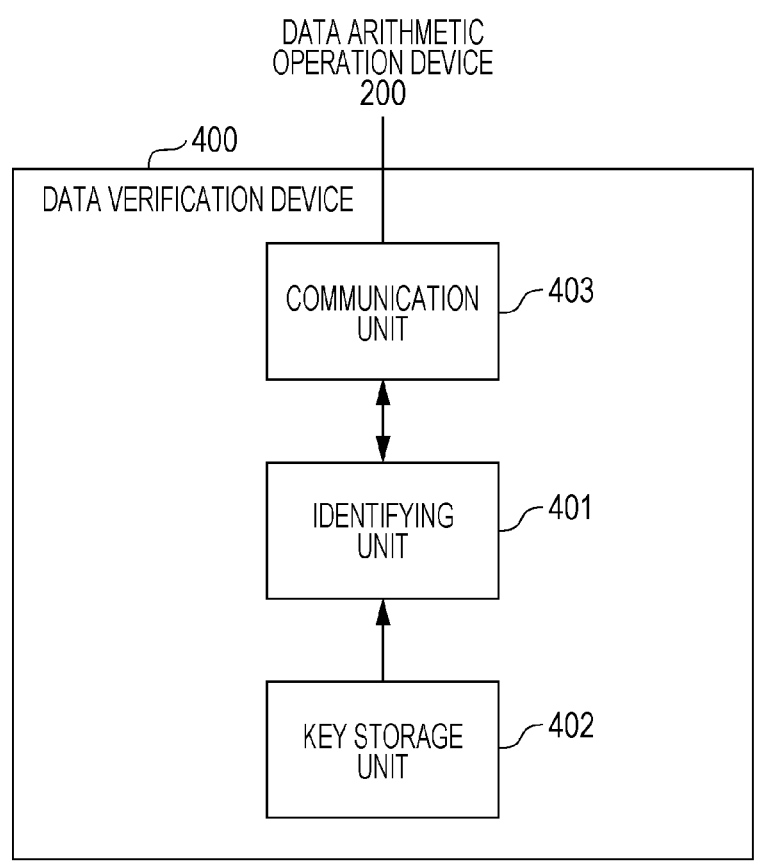
FIG. 7 is a structural diagram depicting the structure of a data verification device in the embodiment.

The data verification device 400 is configured to include, as depicted in FIG. 7, an identifying unit 401, a key storage unit 402, and a communication unit 403.

1.5.1 Identifying Unit

If a key has been leaked from the user terminal device 100, the identifying unit 401 identifies from which user terminal device 100 the key has been leaked. For example, if a key has been leaked from the user terminal device 100 and an unauthorized terminal such as a clone terminal device has created, the identifying unit 401 identifies from which user terminal device 100 the key has been leaked through communication regarding a similarity search request from the unauthorized terminal. Specifically, the identifying unit 401 receives a set of an encrypted feature value and a group signature from the data arithmetic operation device 200 via the communication unit 403.

Next, the identifying unit 401 uses a tracing key of the group signature to identify a secret key used for the signature, and also outputs identification information for identifying the secret key. The output destination of the identification information is, but not limited to, the user terminal device 100 of the user regarding the secret key, for example.

1.5.2 Key Storage Unit

The key storage unit 402 stores a key for use in encryption process at the identifying unit 401. The key storage unit 402 stores a tracing key for group signature tracing process at the identifying unit 401.

1.5.3 Communication Unit

The communication unit 403 performs communications with the data arithmetic operation device 200. For communications, for example, encrypted communication based on TLS is used.

By the communication unit 403, the data verification device 400 and the data arithmetic operation device 200 mutually authenticate each other based on TLS for data encryption. A public key certificate and a secret key for use in TLS are retained by the communication unit 403.

1.6 Operation of Information Processing System

The operation of the information processing system 10 includes two processes, that is, a search process of searching for similar reference data by calculating a distance with the information being encrypted, and an identifying process of identifying a leaked key.

1.6.1 Search Process

Figure 8:
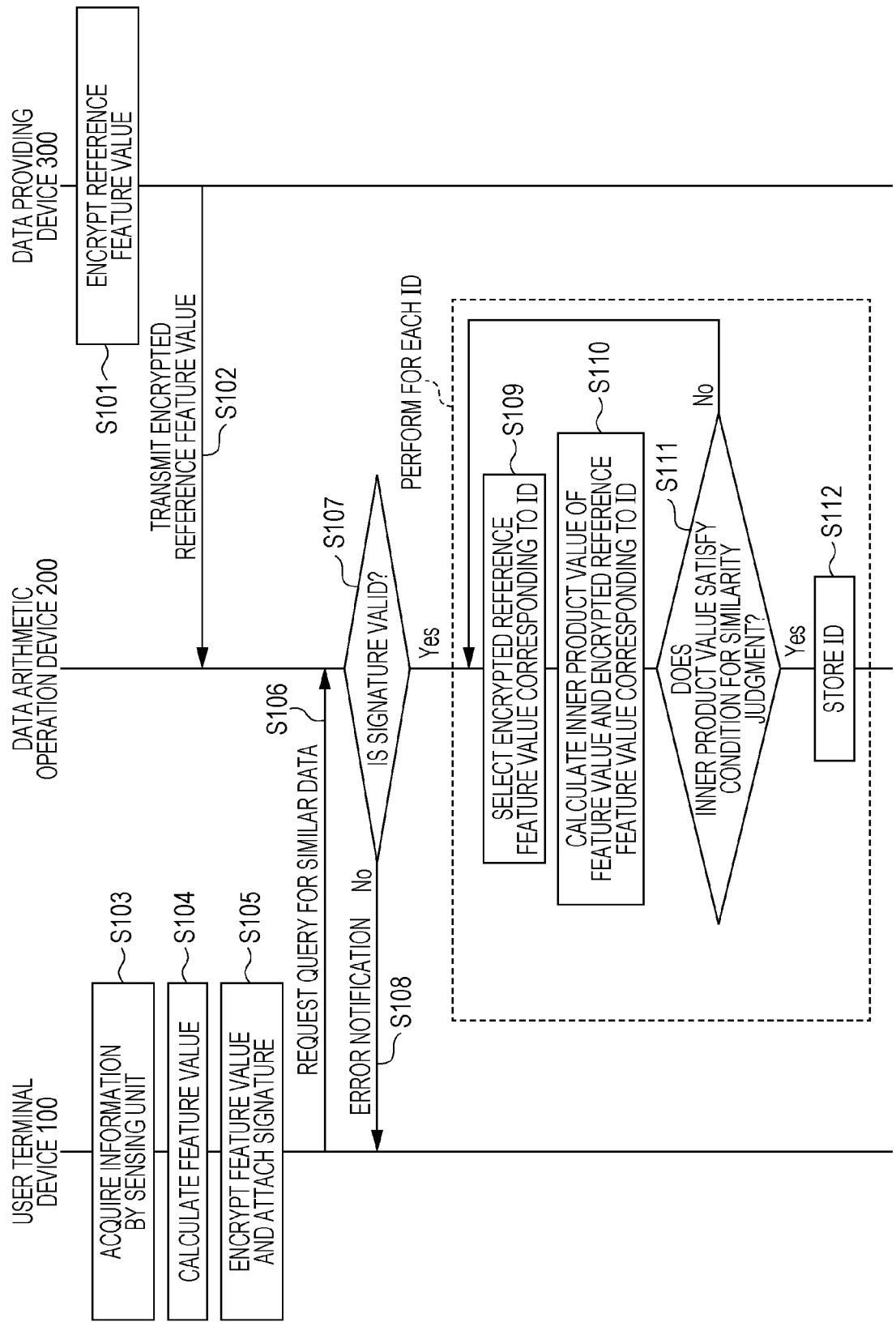
FIG. 8 is a first sequence diagram depicting the operation of an information processing system in the embodiment.
Figure 9:
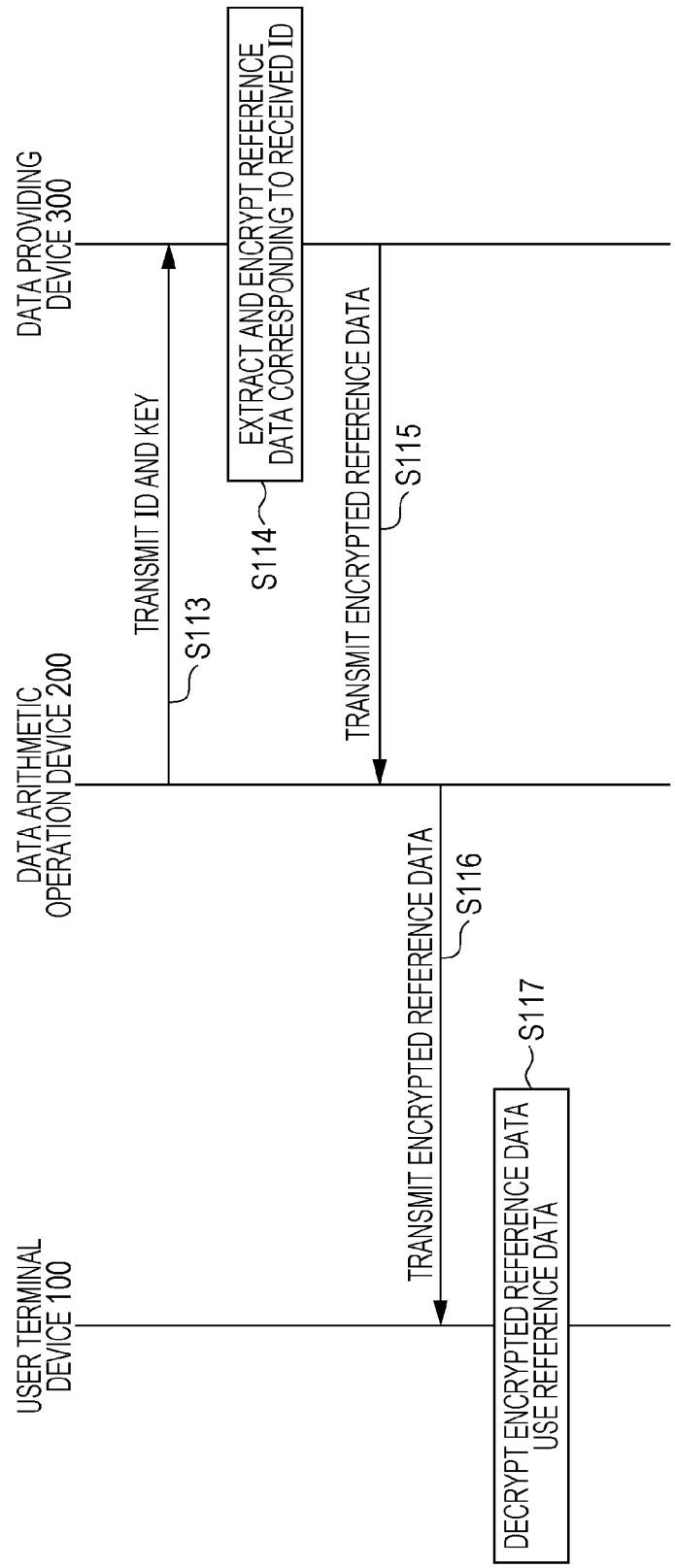
FIG. 9 is a second sequence diagram depicting the operation of the information processing system in the embodiment.

The operation of the search process by the information processing system 10 is described by using sequence diagrams depicted in FIG. 8 and FIG. 9. FIG. 8 and FIG. 9 are first and second sequence diagrams depicting the operation of the information processing system 10 in the present embodiment.

At step S101, in the data providing device 300, the reference feature value encryption unit 302 encrypts each reference feature value stored in the reference feature value storage unit 301. Thus, each reference feature value is encrypted by the predetermined inner product encryption, and a plurality of encrypted reference feature value are generated.

At step S102, the data providing device 300 associates the plurality of encrypted reference feature values with relevant IDs for transmission to the data arithmetic operation device 200. The plurality of encrypted reference feature values are transmitted to the data arithmetic operation device 200 in response to, for example, the data providing device 300 receiving a request from the data arithmetic operation device 200. The data arithmetic operation device 200 receives and acquires the plurality of transmitted encrypted reference feature values, and stores the plurality of acquired encrypted reference feature values in the encrypted feature value storage unit 203.

At step S103, in the user terminal device 100, the sensing unit 101 acquires information. The information to be acquired includes, for example, privacy data about a user.

At step S104, in the user terminal device 100, the feature value calculation unit 102 calculates a feature value from the information acquired by the sensing unit 101.

At step S105, in the user terminal device 100, the feature value encryption unit 104 encrypts the feature value calculated at step S104, and the feature value encryption unit 104 generates a group signature. Thus, with the feature value encrypted by inner product encryption, an encrypted feature value is generated, and a group signature of the encrypted feature value is generated.

At step S106, in the user terminal device 100, the communication unit 107 transmits a query including the encrypted feature value, the group signature, and the user's public key to the data arithmetic operation device 200. This query is a query requesting for similar data. The similar data is, for example, reference data indicating data about another person having a feature similar to the feature value regarding the user. Also, for similarity determination, a condition for similarity judgment is used. Thus, the encrypted feature value is provided from the user terminal device 100 to the data arithmetic operation device 200.

At step S107, the data arithmetic operation device 200 uses the encrypted feature value and the group signature included in the query received from the user terminal device 100 to judge whether the signature is valid by verification with a signature verification key.

If judging that the signature is invalid (No at step S107), the data arithmetic operation device 200 issues an error notification to the user terminal device 100 at step S108. If judging that the signature is valid (Yes at step S107), the process proceeds to step S109.

Processes from step S109 to step S112 described below are performed for each of the IDs provided to the plurality of encrypted reference feature values.

At step S109, the data arithmetic operation device 200 selects an encrypted reference feature value corresponding to an i-th ID among the plurality of encrypted reference feature values acquired from the data providing device 300. Here, for example, i is initially 1, and is incremented by one every time step S109 is repeated until i becomes the number of encrypted reference feature values generated at step S101, that is, a total sum of reference feature values or IDs.

At step S110, in the data arithmetic operation device 200, the encrypted distance calculation unit 201 calculates an inner product value by inner product computation using the encrypted reference feature value selected at step S109 and the encrypted feature value received from the user terminal device 100. From this calculation result, an inner product value of the feature value and the reference feature value corresponding to the i-th ID can be acquired.

At step S111, in the data arithmetic operation device 200, the encrypted distance calculation unit 201 judges whether the inner product value calculated at step S110 satisfies the condition for similarity judgment. Specifically, the encrypted distance calculation unit 201 judges whether the inner product value calculated at step S110 satisfies a condition of being equal to or smaller than a predetermined threshold. When judging that the inner product value satisfies the condition (Yes at step S111), the process proceeds to step S112. Otherwise (No at step S111), i is incremented by one, and the process proceeds to step S109.

At step S112, since the reference feature value corresponding to the i-th ID is similar to the feature value, the encrypted distance calculation unit 201 temporarily stores the i-th ID as an ID with its reference feature value similar to the feature value. After step S112, it is judged whether the processes from step S109 to step S112 have been performed for all IDs provided to the plurality of encrypted reference feature values. If the above processes have been performed for all of the IDs, the process proceeds to step S113. Otherwise, i is incremented by one, and the process proceeds to step S109.

At step S113, a request for reference data including one or more IDs stored at step S112 and the user's public key are transmitted to the data providing device 300.

At step S114, the data providing device 300 receiving the reference data request extracts reference data corresponding to the ID received from the data arithmetic operation device 200 from the reference data storage unit 304, and the reference data encryption unit 305 encrypts the extracted reference data by using the user's public key.

At step S115, in the data providing device 300, the communication unit 306 transmits the reference data encrypted by the reference data encryption unit 305 to the data arithmetic operation device 200.

At step S116, the data arithmetic operation device 200 transmits the encrypted reference data received from the data providing device 300 to the user terminal device 100. Here, if the reference data received from the data providing device 300 has been encrypted with the public key of the user terminal device 100 or the like, the data arithmetic operation device 200 can transmit the encrypted reference data received from the data providing device 300 as it is to the user terminal device 100.

At step S117, the user terminal device 100 receives the encrypted and transmitted reference data, the decryption unit 105 decrypts that reference data, and the reference data using unit 106 uses the reference data.

1.6.2 Data Exchange Between User Terminal Device and Data Arithmetic Operation Device FIG. 10A is a diagram depicting an example of a format of communication data in the present embodiment. Specifically, FIG. 10A depicts an example of the format of communication data transmitted from the user terminal device 100 to the data arithmetic operation device 200 at step S106.

The communication data depicted in FIG. 10A has a field indicating "similar data request command" as a command type, a field including an "encrypted feature value" as data, and a field including a group signature.

FIG. 10B is a diagram depicting another example of the format of communication data in the present embodiment. Specifically, FIG. 10B depicts an example of the format of communication data transmitted from the data providing device 300 to the data arithmetic operation device 200 at step S115 and communication data transmitted from the data arithmetic operation device 200 to the user terminal device 100 at step S116.

The communication data depicted in FIG. 10B has a field indicating "similar data reply command" as a command type and a field including one or more pieces of "encrypted reference data" as data.

When commands are exchanged concurrently between the plurality of user terminal devices 100 and the plurality of data arithmetic operation devices 200, an identifier for linking the communication data at step S106 and the communication data at step S115 may be added to the communication data.

1.6.3 Identifying Process

The operation of the identifying process by the information processing system 10 is described by using a sequence diagram depicted in FIG. 11.

At step S201, based on the state of the process at each device, the state of communication among the respective devices, and so forth, the data verification device 400 detects an unauthorized access, that is, abnormal operation different from normal operation. For example, based on behaviors of the amount of communication accesses to each device, behaviors of the communication data size flowing through a network, or the like, if detecting an event such as an abnormal increase in communication data size compared with that at normal times or an abnormal increase in similar data requests within a predetermined period, the data verification device 400 detects such an event as an abnormal operation. Here, for example, this event can be detected if the communication data size twice as much as an average communication data size at normal times or more is momentarily detected. The same goes for similarity data requests. Also, even if a key is suspected to be leaked from the user terminal device 100, for example, a clone terminal device of the user terminal device 100 has been found, the data verification device 400 detects this event as an abnormal operation.

At step S201, if an abnormal operation is detected (Yes at step S201), the process proceeds to step S202. Otherwise (No at step S201), the process at step S201 is performed again. That is, the data verification device 400 becomes in a wait state at step S201 until an abnormal operation is detected.

At step S202, the data verification device 400 request the data arithmetic operation device 200 to provide a set of an encrypted feature value and a group signature. Here, the data verification device 400 may request all encrypted feature values or, if an abnormal user terminal device 100 has been ascertained, may request only the encrypted feature value for that abnormal user terminal device 100.

At step S203, the data arithmetic operation device 200 transmits, to the data verification device 400, the set of the encrypted feature value received from the user terminal device 100 and stored in the encrypted feature value storage unit 203 and the group signature.

At step S204, the data verification device 400 receives the set of the encrypted feature value and the group signature from the data arithmetic operation device 200. The identifying unit 401 uses the tracing key stored in the key storage unit 402 to trace the group signature and identify the key of the user terminal device 100 whose key is leaked.

At step S205, the data verification device 400 notifies the user terminal device 100 whose key is leaked that the key is leaked. Here, no notification may be made if the identified user terminal device 100 evidently performs an unauthorized operation.

1.7 Effects

In the present embodiment, the data arithmetic operation device 200 uses the feature value encrypted by the user terminal device 100 and the reference feature value encrypted by the data providing device 300 to calculate an inner product value or Euclidean distance with encryption. Thus, the data arithmetic operation device 200 extracts similar reference data calculated from the reference feature value similar to the feature value among the plurality of reference feature values. Here, the data arithmetic operation device 200 handles the feature value of the user terminal device 100 and the reference feature value of the data providing device 300 as being encrypted, that is, does not handle these values in plain text form, and thus can protect privacy data. Also, only the reference data with its inner product value or Euclidean distance equal to or smaller than the threshold is extracted, and thus computational complexity and communication data size of the user terminal device 100 can be reduced.

Furthermore, the group signature is used as a signature for the encrypted feature value from the user terminal device 100, thereby providing anonymity. Also, what is only known is that the user is an authorized user for the service, and information unique to the user does not have to be disclosed. Thus, the present embodiment has an advantage that superfluous information does not have to be transmitted from the user terminal device 100 to the data arithmetic operation device 200.

Still further, the key leaked from the user terminal device 100 can be identified. Thus, the system can be updated, with the leaked key being precluded. Yet further, since identifying the leaked key may lead to identifying an attacker, an attack inhibiting effect is also implemented. Based on these effects, an effect of improving and keeping system safety is also implemented.

First Modification Example of Embodiment

In the present modification example, required processes and components of an information processing method and information processing system which more appropriately protect privacy data while inhibiting an increase in processing load and communication data size at terminals are described.

Figure 12:
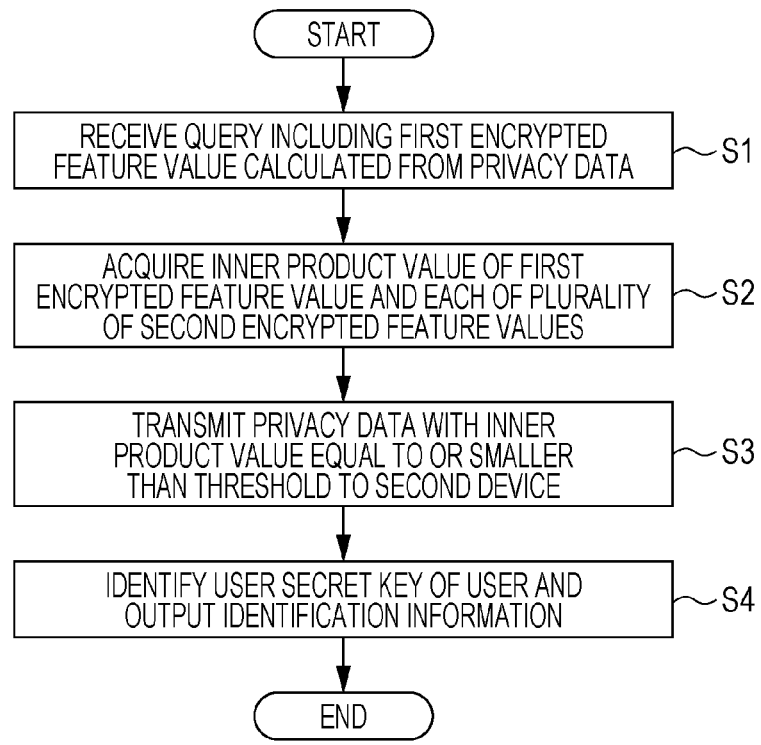
FIG. 12 is a flow depicting an information processing method in a first modification example of the embodiment.
Figure 13:
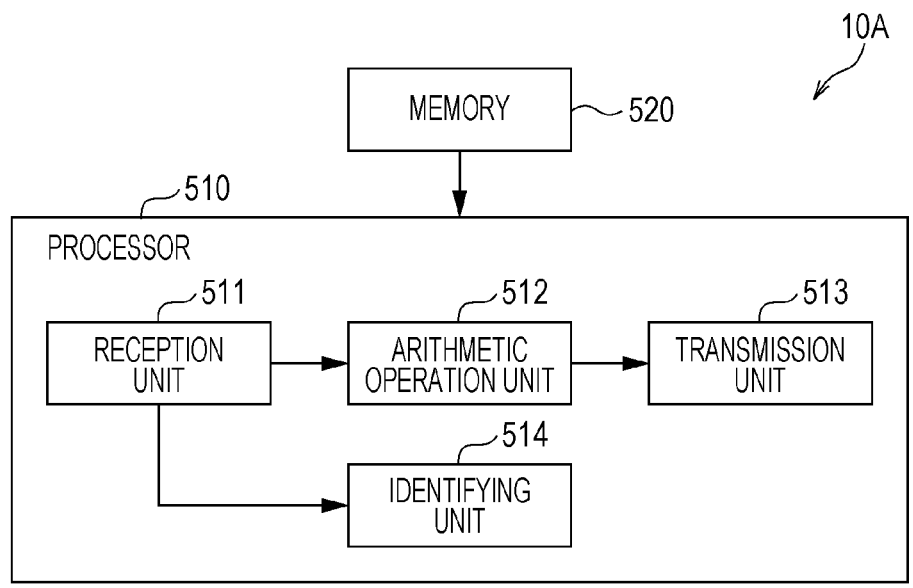
FIG. 13 is a block diagram depicting the structure of an information processing system in the first modification example of the present embodiment.

FIG. 12 is a flow depicting the information processing method in the present modification example. FIG. 13 is a block diagram depicting the structure of an information processing system 10A in the present modification example.

As depicted in FIG. 13, the information processing system 10A includes a processor 510 and a memory 520. The information processing method depicted in FIG. 12 can be implemented by the processor 510 using the memory 520 and others.

As depicted in FIG. 12, the information processing method in the present modification example includes steps S1 to S4.

The memory 520 stores a plurality of second encrypted feature values generated by encrypting each of a plurality of reference feature values calculated from a plurality of pieces of privacy data acquired in advance by using inner product encryption. The plurality of reference feature values are each represented as an n-dimensional vector, where n is an integer equal to or larger than 1.

At step S1, a query including a first encrypted feature value provided with confidential information unique to the user is received from the second device connected to the first device. The first encrypted feature value is generated by encrypting a first feature value calculated from the privacy data of the user by using inner product encryption, and the first feature value is represented by an n-dimensional vector.

At step S2, an inner product of the first encrypted feature value and each of the plurality of second encrypted feature values is computed, thereby acquiring a plurality of inner product values.

At step S3, from among a plurality of pieces of privacy data, a piece of privacy data with an inner product value of the first encrypted feature value and the second encrypted feature value with the encrypted reference feature value calculated from the privacy data being equal to or smaller than a predetermined threshold is transmitted to the second device.

At step S4, when an authorized access to the first device is detected, a secret key of the user is identified by using the confidential information included in the query, and identification information for identifying the secret key of the user is outputted to the second device.

Also, the processor 510 executes a predetermined program by using the memory 520, thereby being capable of implementing each function of a reception unit 511, an arithmetic operation unit 512, a transmission unit 513, and an identifying unit 514.

By the processor 510, the reception unit 511 receives, from the second device connected to the first device, a query including the first encrypted feature value provided with confidential information unique to the user. The first encrypted feature value is generated by encrypting a first feature value calculated from the privacy data of the user by using inner product encryption, and the first feature value is represented by an n-dimensional vector.

By the processor 510, the arithmetic operation unit 512 computes an inner product of the first encrypted feature value and each of the plurality of second encrypted feature values, thereby acquiring a plurality of inner product values.

By the processor 510, from among a plurality of pieces of privacy data, the transmission unit 513 transmits, to the second device, a piece of privacy data with an inner product value of the first encrypted feature value and the second encrypted feature value with the encrypted reference feature value calculated from the privacy data being equal to or smaller than a predetermined threshold.

By the processor 510, when an authorized access to the first device is detected, the identifying unit 514 identifies a secret key of the user by using the confidential information included in the query, and outputs identification information for identifying the secret key of the user to the second device.

With this, the information processing system 10A more appropriately protects privacy data while inhibiting an increase in processing load and communication data size at terminals.

Second Modification Example of Embodiment

While the present disclosure has been described based on the above embodiment, it goes without saying that the present disclosure is not limited to the above embodiment and can also include the following cases.

(1) While the group signature is used to identify a key leaked from the user terminal device 100 in the above embodiment, a traitor tracing technique may be used. As a traitor tracing technique, the technique disclosed in "Linear Code Implies Public-Key Traitor Tracing", Kaoru Kurosawa and another one, [online], "Public Key Cryptography—PKC 2002", [searched on Aug. 1, 2017], Internet (URL: https://eprint.iacr.org/2001/099.ps), Springer Berlin Heidelberg can be applied.

A specific structure is as follows. Here, description is made when, for example, the number of user terminal devices 100 is m, that is, m user terminal devices 100 from a user terminal device 1001 to a user terminal device 100*m* are present. Also, description is made by using inner product encryption of the above-cited document "Efficient Functional Encryption for Inner-Product Values with Full-Hiding Security".

By using a matrix H with m rows and m columns and m-th vector e, an m-th vector a which is a system secret key and is set so as to satisfy e=aH is stored in the key storage unit 303 of the data providing device 300 and the key storage unit 402 of the data verification device 400.

Also, a vector Hi configuring an i-th column of the matrix H and an i-th element ei of the vector e are taken as user secret keys and stored in the key storage unit 103 of the user terminal device 100i. Here, i takes each integer value from 1 to m, and the same goes for the following. Also, these user secret keys correspond to confidential information unique to the user.

When encryption is performed at the feature value encryption unit 104, the user terminal device 100i uses a secret key of the inner production encryption and the vector Hi and the element ei as user secret keys for encryption in inner product encryption. A specific encryption process arithmetic operation is depicted in FIG. 14A. In FIG. 14A, CTx represents an encrypted feature value. Here, by inputting the vector Hi and the element ei as user secret keys in the encryption process arithmetic operation, CTx becomes an encrypted feature value unique to the user terminal device 100i, and includes identification information for identifying the user terminal device 100i. The user terminal device 100i transmits CTx acquired in the above-described manner as a query at step S106 in the first embodiment.

In encryption at the reference feature value encryption unit 302, the data providing device 300 uses the secret key of inner product encryption and a system secret key a in encryption of inner product encryption. A specific encryption process arithmetic operation is depicted in FIG. 14B. In FIG. 14B, SKy represents an encrypted reference feature value. Here, y indicates each reference feature value Yk. That is, in the example of the above embodiment, the number of SKy present is k.

The data arithmetic operation device 200 calculates an encrypted distance based on the encrypted feature value CTx acquired from the user terminal device 100i and the plurality of SKy acquired from the data providing device 300. A specific distance calculation process is depicted in FIG. 14C. Here, an inner product value of x and y can be computed from $$g_T^{\vec{x}\cdot\vec{y}}$$

Here, since e=aH holds, CTx and SKy are computed, and only the inner product value of x and y is outputted.

The data verification device 400 generates a vector yt of the same dimension as that of the reference feature value, and generates SKyt by using inner product encryption with the vector a retained in the key storage unit 402. Next, the vector a retained in the key storage unit 402 is changed to an m-th vector aj in which only the encrypted feature value generated by the user terminal device 100j does not allow e=aH to hold, thereby generating SKytj. Here, a random number is inputted to an element corresponding to the user terminal device 100j among the elements of the m-th vector a to generate the vector aj. As with the computation in FIG. 14C, the data verification device 400 uses, for computation, the encrypted feature value received from the data arithmetic operation device 200 for each of SKyt and SKytj to find an inner product value D. Here, if the inner product value D acquired by computation with CTx and SKyt and the inner product value D acquired by computation with CTx and SKytj are equal to each other, the key of the user terminal device 100j can be identified as being leaked.

With this, the data arithmetic operation device 200 handles the feature value of the user terminal device 100 and the reference feature value of the data providing device 300 as being encrypted, that is, does not handle these values in plain text form, and thus can protect privacy data. Also, since the key leaked from the user terminal device 100 can be identified, the system can be updated, with the leaked key being precluded. Still further, since identifying the leaked key may lead to identifying an attacker, an attack inhibiting effect is also implemented.

In this manner, the data arithmetic operation device 200 identifies a secret key of the user by: acquiring a first inner product value as an inner product value of the second encrypted feature value and a first encrypted feature value included in the query; generating, for each of the plurality of users, a verification secret key with an element of elements of a system secret key corresponding to one user among the plurality of users being changed into a random number; acquiring, for each of the plurality of users, a second inner product value as an inner product value of a verification value generated by encrypting a reference feature value by inner product encryption using a verification secret key and the first encrypted feature value included in a query; and identifying a secret key of a user with the first inner product value and the second inner product value not matching each other among the plurality of users.

(2) In the above embodiment, an example of conversion at the user terminal device 100 and the data providing device 300 when a Euclidean distance is computed is described. Here, conversion is performed so that <X', Y1'> satisfies the following Equation (4).

$$\Sigma xj^2 + \Sigma y1j^2 - 2x1\cdot y11 - 2x2\cdot y12 - \ldots - 2xn\cdot y1n = \Sigma(xj-y1j)^2 \qquad (4)$$

In another specific conversion method, conversion may be such that X'=(Σxj^2, 1, -2x1, -2x2, . . . -2xn) and Y1'=(1, Σy1j^2, y11, y12, . . . , y1n).

(3) While an example is described in the above embodiment in which a Euclidean distance is computed by using inner product encryption, a weighted Euclidean distance may be computed. When a weighted Euclidean distance is computed, if a weight of each element j is taken as wj, X'=(Σ(wj·xj^2), 1, x1, x2, . . . , xn) holds in the conversion method at the user terminal device 100, and Y1'=(1, Σ(wj·y1j^2), -2w1·y11, -2w2·y12, -2wn·y1n) holds in the conversion method at the data providing device 300. Here, <X', Y1'> is represented by the following Equation (5).

$$\langle X', Y1' \rangle = \sum (wj\cdot xj^2) + \sum (wjyij^2) - 2w1\cdot x1\cdot yi1 - 2w2\cdot x2\cdot yi2 - \ldots - 2wn\cdot xn\cdot yin \qquad (5)$$
$$= \sum wj(xj - yij)^2$$

(4) In the above embodiment, the encrypted distance calculation unit 201 calculates a Euclidean distance by conversion at the feature value encryption unit 104 and the reference feature value encryption unit 302. By changing the conversion method as follows, the n-th power of a difference between the feature value and the reference feature value can be calculated, which corresponds to an extended Euclidean distance.

For example, when Σ(xj-y1j)^3 is computed, X' and Y1' are converted as in the following Equation (6) and Equation (7), respectively.

$$X'=(\Sigma xj^3, 1, x1^2, x1, x2^2, x2, \ldots, xn^2, xn)$$
$$(j=1, \ldots, n) \qquad (6)$$

$$Y1'=(1,\Sigma y1j^3,-3y11,3y11^2,-3y12,3y12^2,-3y1n,3y1n^2) \quad (7)$$

Here, $<X', Y1'>=\Sigma(xj-y1j)^3$ holds. Therefore, the cube of the difference between the feature value and the reference feature value can be calculated. If conversion is similarly performed, the n-th power can be computed.

As further extension of the Euclidean distance, for example, if the power value is changed for each element, such as the square for the first term and the cube for the second term, conversion can be similarly performed.

(5) In the above embodiment, to allow computation of a Euclidean distance, the reference feature value may be converted in advance at the data providing device 300, and the encrypted reference feature value acquired by conversion and encryption at the data arithmetic operation device 200 may be stored.

(6) In the above embodiment, as depicted in FIG. 8, the data arithmetic operation device 200 judges whether the Euclidean distance as the result of inner product computation satisfies the condition for similarity judgment as for all encryption reference feature values corresponding to all IDs. Alternatively, for example, the judgment may end when it is found that a predetermined number of Euclidean distances satisfy the condition for similarity judgment. Here, the predetermined number is set as 10, for example.

Also, the data arithmetic operation device 200 may transmit, to the user terminal device 100, only the reference data corresponding to a predetermined number of reference feature values in increasing order of Euclidean distances acquired with the feature value from among all reference feature values. Here, the predetermined number is set as 10, for example.

(7) In the above embodiment, the encrypted reference feature value may be transmitted from the data providing device 300 to the data arithmetic operation device 200 in response to a request from the data arithmetic operation device 200 to the data providing device 300 or spontaneously by the data providing device 300 irrespective of the presence or absence of the request.

Also, after receiving a request for a similar search from the user terminal device 100, the data arithmetic operation device 200 may request the data providing device 300 to transmit the encrypted reference feature value and, in response to this request, the data providing device 300 may transmit the encrypted reference feature value to the data arithmetic operation device 200.

(8) In the above embodiment, at step S204 of the data verification device 400, the group signature of the received query may be verified.

(9) While the data providing device 300 and the data verification device 400 are different devices in the above embodiment, they may the same device.

(10) Each of the above devices is, specifically, a computer system configured of a microprocessor, ROM, RAM, hard disk unit, display unit, keyboard, mouse, and so forth. A computer program is recorded on the RAM or hard disk unit.

With the microprocessor operating by following the computer program, each device implements its function. Here, the computer program is configured by combining a plurality of instruction codes indicating instructions to the computer to implement a predetermined function.

(11) An entire or part of components configuring each of the above devices may be configured of one system large scale integration (LSI). The system LSI is an ultra-multifunctional LSI manufactured by integrating a plurality of component units on one chip and, specifically, is a computer system configured to include a microprocessor, ROM, RAM, and so forth. A computer program is recorded on the RAM. With the microprocessor operating by following the computer program, the system LSI implements its function.

Also, the each part of the components configuring each of the above devices may be individually made as one chip, or one chip may be made so as to include an entire or part of the components.

While the system LSI is assumed herein, this may be referred to as an IC, LSI, super LSI, or ultra LSI, depending on the degree of integration. Also, an integrated circuit may be implemented not only by an LSI but also by a dedicated circuit or general-purpose processor. A field programmable gate array (FPGA) which allows programming after LSI manufacture or a reconfigurable processor which allows reconfiguration of circuit cell connection and settings inside the LSI may be used.

Furthermore, if integrated circuit technology capable of replacing LSI technology emerges with the advance of semiconductor technologies and other derivative technologies, it goes without saying that this technology may be used for integration of functional blocks. For example, there is a possibility of application of biotechnology.

(12) An entire or part of components configuring each of the above devices may be configured of an IC card or single module attachable to and removable from each device. The IC card or module is a computer system configured of a microprocessor, ROM, RAM, and so forth. The IC card or module may include the above ultra-multifunctional LSI. With the microprocessor operating by following the computer program, the IC card or module implements its function. This IC card or module may have tamper resistance.

(13) The present disclosure may be the methods described above, a computer program implementing these methods by a computer, or a digital signal formed of a computer program.

Also, in the present disclosure, a computer program or digital signal may be recorded on a computer-readable recording medium, for example, a flexible disk, hard disk, CD-ROM, MO, DVD, DVD-ROM, DVD-RAM, Blu-ray® disc (BD), semiconductor memory, or the like. Also, the present disclosure may be a digital signal recorded on any of these recording medium.

Furthermore, in the present disclosure, a computer program or digital signal may be transferred via an electric communication line, wireless or wired communication line, a network typified by the Internet, data broadcast, or the like.

Still further, the present disclosure may be a computer system including a microprocessor and a memory, the memory may have the computer program recorded thereon, and the microprocessor may operate by following the computer program.

Yet further, with a program or digital signal recorded on a recording medium for transfer or with a program or digital signal being transferred via a network or the like, the present disclosure may be implemented by another independent computer system.

(14) The above embodiment and modification examples may be combined in any manner.

The techniques described in the above aspects can be implemented by, for example, the following cloud service types. However, the cloud service types implementing the techniques described in the above aspects are not limited to the following cloud service types.

(First Service Type: Own-Data-Center-Type Cloud Service)

Figure 15:
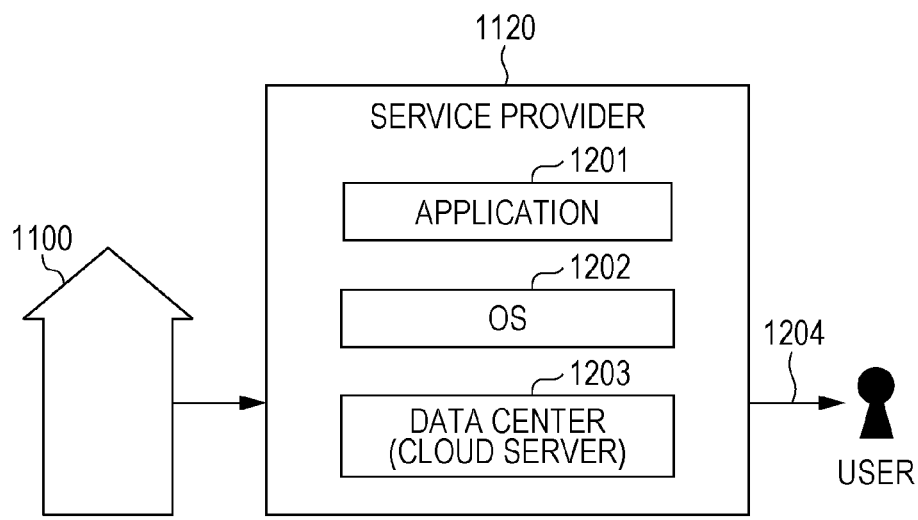
FIG. 15 is a diagram depicting an entire image of a service provided by the information management system in a first service type (own-data-center-type cloud service)

FIG. 15 is a diagram depicting an entire image of a service provided by the information management system in a first service type (own-data-center-type cloud service). In this type, the service provider 1120 acquires information from a group 1100, and provides a service to a user. In this type, the service provider 1120 has a function of a data center operation company. That is, the service provider 1120 owns the cloud server 1111 which manages big data. Therefore, no data center operation company is present.

In this type, the service provider 1120 operates and manages a data center (cloud server) 1203. Also, the service provider 1120 manages an operating system (OS) 1202 and an application 1201. The service provider 1120 uses the OS 1202 and the application 1201 managed by the service provider 1120 to provide a service (arrow 1204).

(Second Service Type: IaaS-Use-Type Cloud Service)

Figure 16:
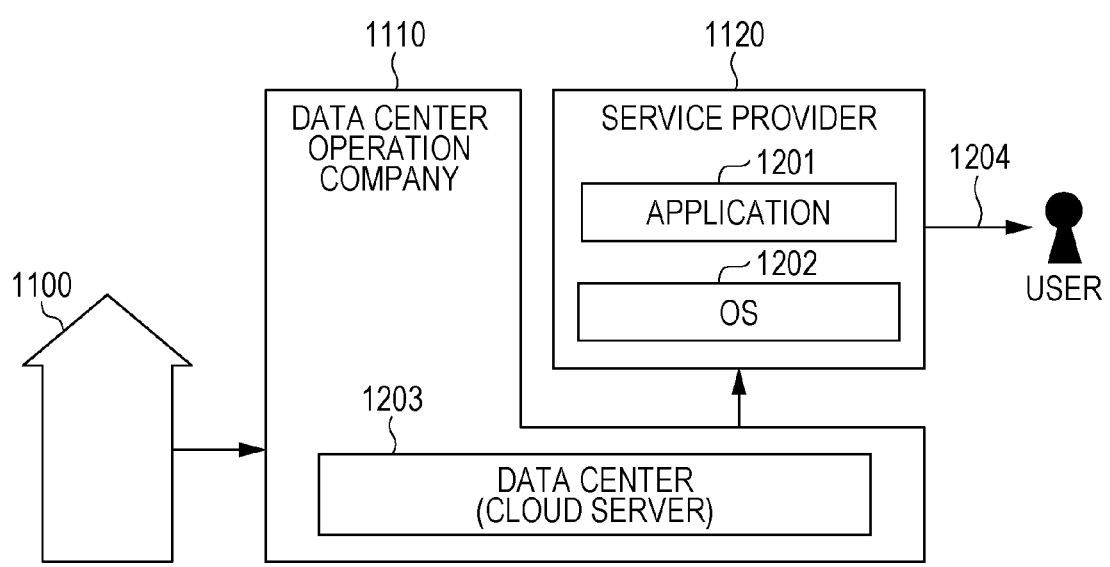
FIG. 16 is a diagram depicting an entire image of a service provided by the information management system in a second service type (IaaS-use-type cloud service)

FIG. 16 is a diagram depicting an entire image of a service provided by the information management system in a second service type (IaaS-use-type cloud service). Here, IaaS is an abbreviation of infrastructure as a service, and is a cloud service provision model which provides, as a service via the Internet, an infrastructure itself for constructing and operating a computer system.

In this type, the data center operation company 1110 operates and manages the data center (cloud server) 1203. Also, the service provider 1120 manages the OS 1202 and the application 1201. The service provider 1120 uses the OS 1202 and the application 1201 managed by the service provider 1120 to provide a service (arrow 1204).

(Third Service Type: PaaS-Use-Type Cloud Service)

Figure 17:
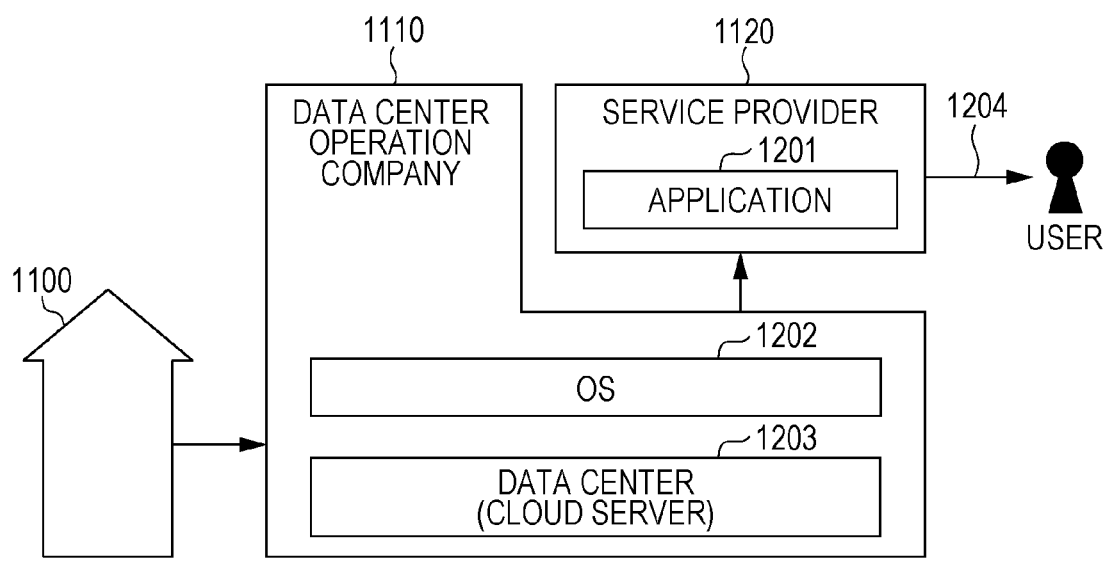
FIG. 17 is a diagram depicting an entire image of a service provided by the information management system in a third service type (PaaS-use-type cloud service)

FIG. 17 is a diagram depicting an entire image of a service provided by the information management system in a third service type (PaaS-use-type cloud service). Here, PaaS is an abbreviation of platform as a service, and is a cloud service provision model which provides, as a service via the Internet, a platform as a base for constructing and operating software.

In this type, the data center operation company 1110 manages the OS 1202, and operates and manages the data center (cloud server) 1203. Also, the service provider 1120 manages the application 1201. The service provider 1120 uses the OS 1202 managed by the data center operation company 1110 and the application 1201 managed by the service provider 1120 to provide a service (arrow 1204).

(Fourth Service Type: SaaS-Use-Type Cloud Service)

Figure 18:
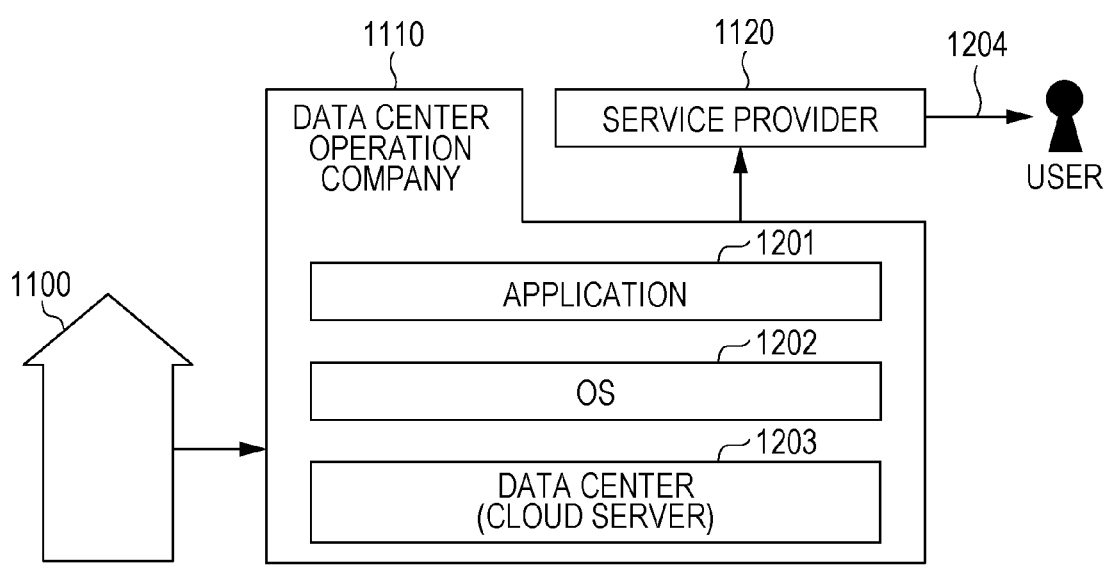
FIG. 18 is a diagram depicting an entire image of a service provided by the information management system in a fourth service type (SaaS-use-type cloud service).

FIG. 18 is a diagram depicting an entire image of a service provided by the information management system in a fourth service type (SaaS-use-type cloud service). Here, SaaS is an abbreviation of software as a service. The SaaS-use-type cloud service is a cloud service provision model with a function of, for example, allowing an application provided by a platform provider owning a data center (cloud server) to be used via a network such as the Internet by a user such as a company not owning the data center (cloud server) or an individual.

In this type, the data center operation company 1110 manages the application 1201, manages the OS 1202, and operates and manages the data center (cloud server) 1203. Also, the service provider 1120 uses the OS 1202 and the application 1201 managed by the data center operation company 1110 to provide a service (arrow 1204).

As described above, in any of the cloud service types, the service provider 1120 provides a service. Also, for example, the service provider or the data center operation company may develop OSs, applications, databases of big data, or the like on its own or may outsource them to a third party.

As has been described above, according to the information processing method of the present embodiment, the information processing system uses the first encrypted feature value based on the privacy data of the user and the plurality of second encrypted feature values based on the plurality of pieces of privacy data to make a similarity judgment with the feature values encrypted, thereby appropriately protecting the privacy data. Also, with the similarity judgment, only the privacy data judged as similar to the privacy data of the user is provided to the second device, that is, the user terminal device. This can inhibit an increase in processing load and communication data size at the terminal devices. Furthermore, based on detection of an unauthorized access, if there is a possibility of leakage of the secret key used for encryption of the first encrypted feature value, a possibly leaked secret key can be identified. This allows a possibility of leakage of the secret key to be recognized, and allows operation such as system update so as to prohibit the leaked secret key. In this manner, the information processing system according to this aspect can more appropriately protect privacy data while inhibiting an increase in processing load and communication data size at terminals.

Also, the information processing system can identify the secret key of the user by using the group signature as the confidential information unique to the user and using the tracing key of the group signature. Based on this specific structure, the information processing system according to this aspect can more appropriately protect privacy data while inhibiting an increase in processing load and communication data size at terminals.

Furthermore, the information processing system can identify the secret key of the user by using the secret key unique to the user in traitor tracing as the confidential information unique to the user and by tracing process by traitor tracing. Based on this specific structure, the information processing system according to this aspect can more appropriately protect privacy data while inhibiting an increase in processing load and communication data size at terminals.

Still further, by using the vital data of the user as the privacy data of the user, the information processing system can extract vital data similar to the vital data of the user from among a plurality of pieces of vital data. This allows the vital data to be more appropriately protected.

Yet further, by using log information about operation of a device or the like by the user as the privacy data of the user, the information processing system can extract log information about operation similar to the log information about operation by the user from among a plurality of pieces of log information about operation. This allows the log information about operation to be more appropriately protected.

Yet further, the information processing system makes a similarity judgment by using the shape of the body of the user or the like as the feature value. Based on this specific structure, the information processing system according to this aspect can more appropriately protect privacy data while inhibiting an increase in processing load and communication data size at terminals.

Yet further, the information processing system can extract vital data similar to the vital data of the user from among vital data of a plurality of different persons. This can avoid extraction of a plurality of pieces of vital data of the same person, thereby making extractable vital data more easily usable.

In each embodiment, each component may be configured of dedicated hardware or may be implemented by execution of a software program suitable for each component. Each component may be implemented by a program execution unit such as a CPU or processor reading and executing a software program recorded on a recording medium such as a hard disk or semiconductor memory. Here, the software implementing the information processing system and others of the embodiment is a program as follows.

That is, this program causes a computer to perform a method for an information processing system including a first device, the first device including a processor and a memory, the method comprising: the memory storing a plurality of second encrypted feature values generated by encrypting each of a plurality of reference feature values calculated from a plurality of pieces of privacy data acquired in advance by using inner product encryption, each of the plurality of reference feature values being represented as an n-dimensional vector, and n being an integer equal to or larger than 1; the processor receiving, from a second device connected to the first device, a query including a first encrypted feature value provided with confidential information unique to a user, the first encrypted feature value being generated by encrypting a first feature value calculated from privacy data of the user by using inner product encryption and the first feature value being represented as an n-dimensional vector; the processor acquiring a plurality of inner product values by computing an inner product of the first encrypted feature value and each of the plurality of second encrypted feature values; the processor transmitting, to the second device, privacy data of the plurality of pieces of privacy data having an inner product value of the first encrypted feature value and a second encrypted feature value with an encrypted reference feature value calculated from the privacy data, the inner product value being equal to or smaller than a predetermined threshold; the processor identifying a secret key of the user by using the confidential information included in the query when an unauthorized access to the first device is detected; and the processor outputting identification information for identifying the secret key of the user to the second device.

In the foregoing, while the information processing method and others according to one or plurality of aspects have been described based on the embodiment, the present disclosure is not limited to this embodiment. Various modifications conceived by a person skilled in the art to the present embodiment and embodiments constructed by combining components of different embodiments without deviating from the gist of the present disclosure may also be included in the range of one or plurality of aspects.

In the present disclosure, an inner product value or Euclidean distance is computed with encryption, and similar data is extracted, thereby allowing privacy protection without handling a user feature value as plain text at the data arithmetic operation device.

What is claimed is:

1. A method for an information processing system including a first device, the first device including a processor and a memory, the method comprising:
    the memory storing a plurality of second encrypted feature values generated by encrypting each of a plurality of reference feature values calculated from a plurality of pieces of privacy data acquired in advance by using inner product encryption, each of the plurality of reference feature values being represented as an n-dimensional vector, and n being an integer equal to or larger than 1;
    the processor receiving, from a second device connected to the first device, a query including a first encrypted feature value provided with confidential information unique to a user, the first encrypted feature value being generated by encrypting a first feature value calculated from privacy data of the user by using inner product encryption and the first feature value being represented as an n-dimensional vector;
    the processor acquiring a plurality of inner product values by computing an inner product of the first encrypted feature value and each of the plurality of second encrypted feature values;
    the processor transmitting, to the second device, privacy data of the plurality of pieces of privacy data having an inner product value of the first encrypted feature value and a second encrypted feature value with an encrypted reference feature value calculated from the privacy data, the inner product value being equal to or smaller than a predetermined threshold;
    the processor identifying a secret key of the user by using the confidential information included in the query when an unauthorized access to the first device is detected; and
    the processor outputting identification information for identifying the secret key of the user to the second device.

2. The method according to claim 1, wherein
the secret key of the user is a signature generation key for a group signature of a group to which the user belongs,
the confidential information includes the group signature, and
the identifying includes identifying the signature generation key from the group signature by using a tracing key of the group signature included in the confidential information included in the query.

3. The method according to claim 1, wherein
the secret key of the user is a unique secret key as a secret key unique to the user in traitor tracing assigned to the second device,
the first encrypted feature value provided with the confidential information is encrypted by inner product encryption using the unique secret key,
the second encrypted feature value is encrypted by inner product encryption using a system secret key, and
the identifying includes
    acquiring a first inner product value as an inner product value of the second encrypted feature value and the first encrypted feature value included in the query,
    generating, for each of plurality of users, a verification secret key with one of elements of the system secret key corresponding to a user of the plurality of users changed to a random number,
    acquiring, for each of the plurality of users, a second inner product value as an inner product value of a verification value generated by encrypting the reference feature value by inner product encryption using the verification secret key and the first encrypted feature value included in the query, and
    identifying a secret key of a user from among the plurality of users, the secret key having the first inner product value and the second inner product value not matching each other.

4. The method according to claim 1, wherein
the privacy data of the user includes vital data of the user.

5. The method according to claim 1, wherein
the privacy data of the user includes log information indicating history of operation of a device or vehicle by the user.

6. The method according to claim 1, wherein
the first feature value includes a component indicating an index regarding at least one of a shape, size, weight, state, and movement of an entire or part of a body of the user.

7. The method according to claim 1, wherein the plurality of pieces of privacy data includes vital data of a plurality of different persons.

8. An information processing system including a first device, the information processing system comprising:
a memory storing a plurality of second encrypted feature values generated by encrypting each of a plurality of reference feature values calculated from a plurality of pieces of privacy data acquired in advance by using inner product encryption, each of the plurality of reference feature values being represented as an n-dimensional vector and n being an integer equal to or larger than 1; and
a processor that, in operation, performs operations including
receiving, from a second device connected to the first device, a query including a first encrypted feature value provided with confidential information unique to a user, the first encrypted feature value being generated by encrypting a first feature value calculated from privacy data of the user by using inner product encryption and the first feature value being represented as an n-dimensional vector,
acquiring a plurality of inner product values by computing an inner product of the first encrypted feature value and each of the plurality of second encrypted feature values,
transmitting, to the second device, privacy data of the plurality of pieces of privacy data having an inner product value of the first encrypted feature value and a second encrypted feature value with an encrypted reference feature value calculated from the privacy data, the inner product value being equal to or smaller than a predetermined threshold,
identifying a secret key of the user by using the confidential information included in the query when an unauthorized access to the first device is detected, and
outputting identification information for identifying the secret key of the user to the second device.

* * * * *